(12) United States Patent
Auclair

(10) Patent No.: US 6,676,013 B2
(45) Date of Patent: Jan. 13, 2004

(54) CARTON AND CARTON BLANK

(75) Inventor: Jean-Michel Auclair, Chateauroux (FR)

(73) Assignee: MeadWestvaco Packaging Systems, LLC, Stamford, CA (US)

( * ) Notice: Subject to any disclaimer, the term of this patent is extended or adjusted under 35 U.S.C. 154(b) by 0 days.

(21) Appl. No.: 10/118,111

(22) Filed: Apr. 6, 2002

(65) Prior Publication Data

US 2002/0148887 A1 Oct. 17, 2002

Related U.S. Application Data

(63) Continuation of application No. PCT/US00/27926, filed on Oct. 10, 2000.

(51) Int. Cl.[7] .................................................. B65D 5/38
(52) U.S. Cl. .............................. 229/122; 229/125.125; 229/129.1; 229/220
(58) Field of Search ....................... 229/125.125, 129.1, 229/168, 122, 220, 240

(56) References Cited

U.S. PATENT DOCUMENTS

| | | | |
|---|---|---|---|
| 944,063 A | | 12/1909 | Warren |
| 1,928,889 A | | 10/1933 | Guyer |
| 2,122,480 A | | 7/1938 | Lowey |
| 2,162,089 A | | 6/1939 | Kagen |
| 2,317,040 A | * | 4/1943 | Ethridge .............. 229/125.125 |
| 2,365,739 A | | 12/1944 | Williamson |
| 2,686,627 A | | 8/1954 | McElwee |
| 2,755,982 A | | 7/1956 | Vander Lugt, Jr. |
| 2,993,631 A | | 7/1961 | Pasin |
| 3,048,320 A | * | 8/1962 | Hovland et al. .......... 229/129.1 |
| 3,074,611 A | * | 1/1963 | Tolaas .................. 229/125.125 |
| 3,078,030 A | | 2/1963 | Gorton |
| 3,107,008 A | | 10/1963 | Margulies |
| 3,126,141 A | | 3/1964 | Walter |
| 3,128,935 A | * | 4/1964 | Ricca .......................... 229/122 |
| 3,137,435 A | | 6/1964 | Meyers |
| 3,160,342 A | | 12/1964 | Murdock et al. |
| 3,279,593 A | | 10/1966 | Cote |
| 3,286,905 A | * | 11/1966 | Farukhi ....................... 229/122 |

(List continued on next page.)

FOREIGN PATENT DOCUMENTS

| | | |
|---|---|---|
| CH | 542 755 | 11/1973 |
| DE | 198 46 027 A1 | 4/2000 |
| EP | 0 796 796 A1 | 9/1997 |
| GB | 1 477 554 | 6/1977 |
| GB | 1 572 073 | 7/1980 |
| GB | 1 604 694 | 12/1981 |
| GB | 2 126 199 | 3/1984 |
| GB | 2 264 103 A | 8/1993 |

Primary Examiner—Gary E. Elkins
(74) Attorney, Agent, or Firm—Tsugihiko Suzuki

(57) ABSTRACT

A carton for packaging one or more articles, for example frozen or chilled foodstuff, comprising an inner tray slidable within an outer sleeve. At least one of the inner tray and the outer sleeve is provided with a plurality of panels for forming a void and a push tab is defined in one or more of the panels forming the void to facilitate opening of the carton.

14 Claims, 29 Drawing Sheets

U.S. PATENT DOCUMENTS

| | | | |
|---|---|---|---|
| 3,297,235 A | 1/1967 | Robbins | |
| 3,366,311 A | 1/1968 | Simpson et al. | |
| 3,458,109 A * | 7/1969 | Compton et al. | 229/220 |
| 3,735,914 A | 5/1973 | Collura et al. | |
| 3,828,923 A | 8/1974 | Phillips, Jr. | 206/254 |
| 3,836,066 A | 9/1974 | Del Priore et al. | |
| RE28,460 E | 7/1975 | Rous | 206/424 |
| 3,900,104 A | 8/1975 | Harned | 206/491 |
| 3,985,230 A | 10/1976 | Meyer et al. | 206/424 |
| 3,986,608 A | 10/1976 | Rous | 206/424 |
| 3,987,955 A * | 10/1976 | Saarinen | 229/220 |
| 4,109,826 A | 8/1978 | Maisonneuve | 221/72 |
| 4,175,675 A | 11/1979 | Maisonneuve | 221/72 |
| 4,189,087 A | 2/1980 | Dlugopolski | |
| 4,339,034 A | 7/1982 | Panveno | 206/313 |
| 4,356,950 A * | 11/1982 | Benham | 229/125.125 |
| 4,396,143 A | 8/1983 | Killy | |
| 4,524,901 A * | 6/1985 | Tikka | 229/220 |
| 4,671,449 A * | 6/1987 | Fronduti | 229/129.1 |
| 5,088,599 A | 2/1992 | Mahler | 206/313 |
| 5,248,032 A | 9/1993 | Sheu et al. | 206/312 |
| 5,505,373 A | 4/1996 | Von Stillfried | 229/129.1 |
| 5,535,940 A | 7/1996 | Olds | 229/110 |
| 5,655,656 A | 8/1997 | Gottlieb | 206/308.1 |
| 5,685,424 A | 11/1997 | Rozek et al. | 206/308.1 |
| 5,775,491 A | 7/1998 | Taniyama | 206/308.1 |

* cited by examiner

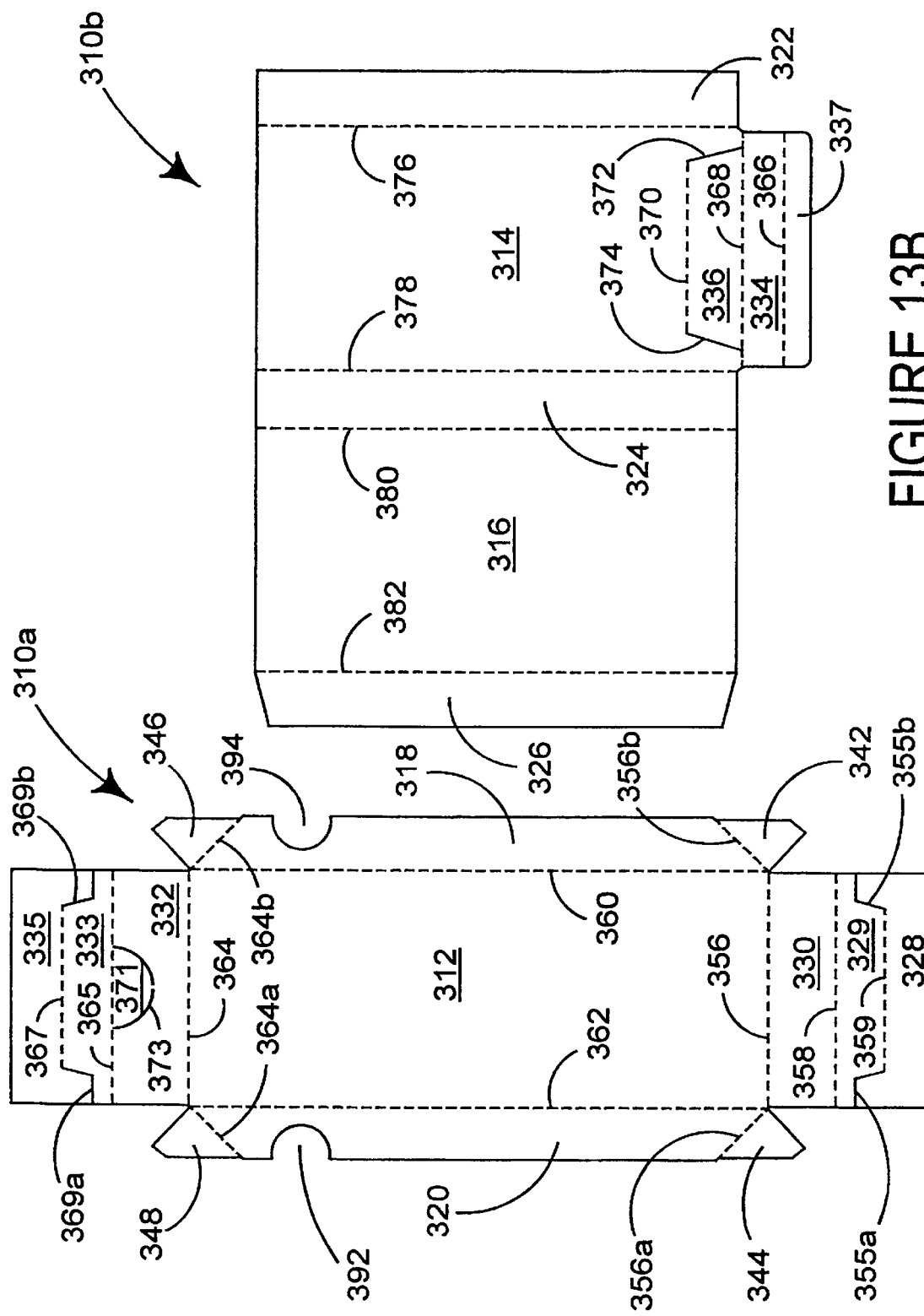

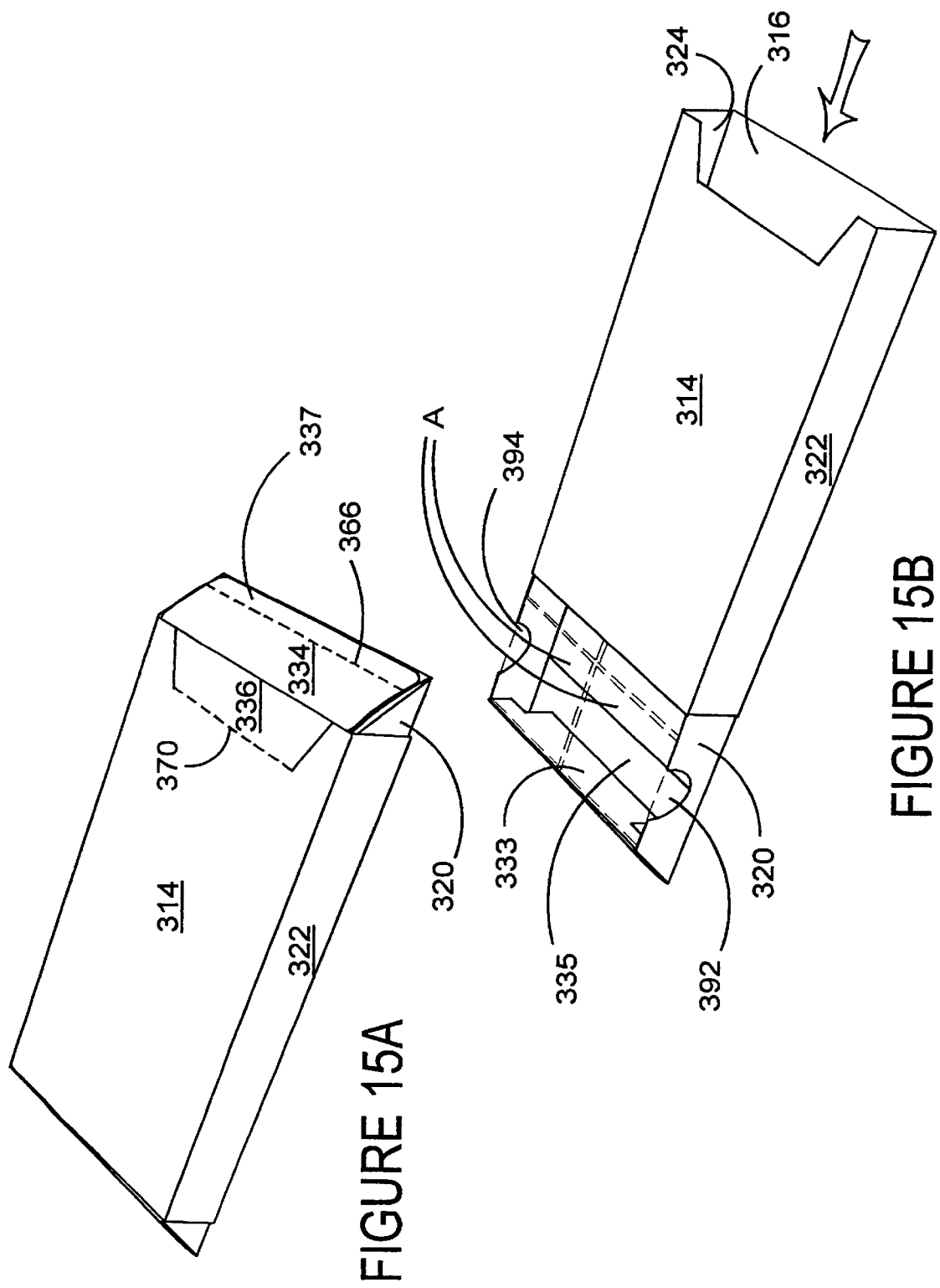

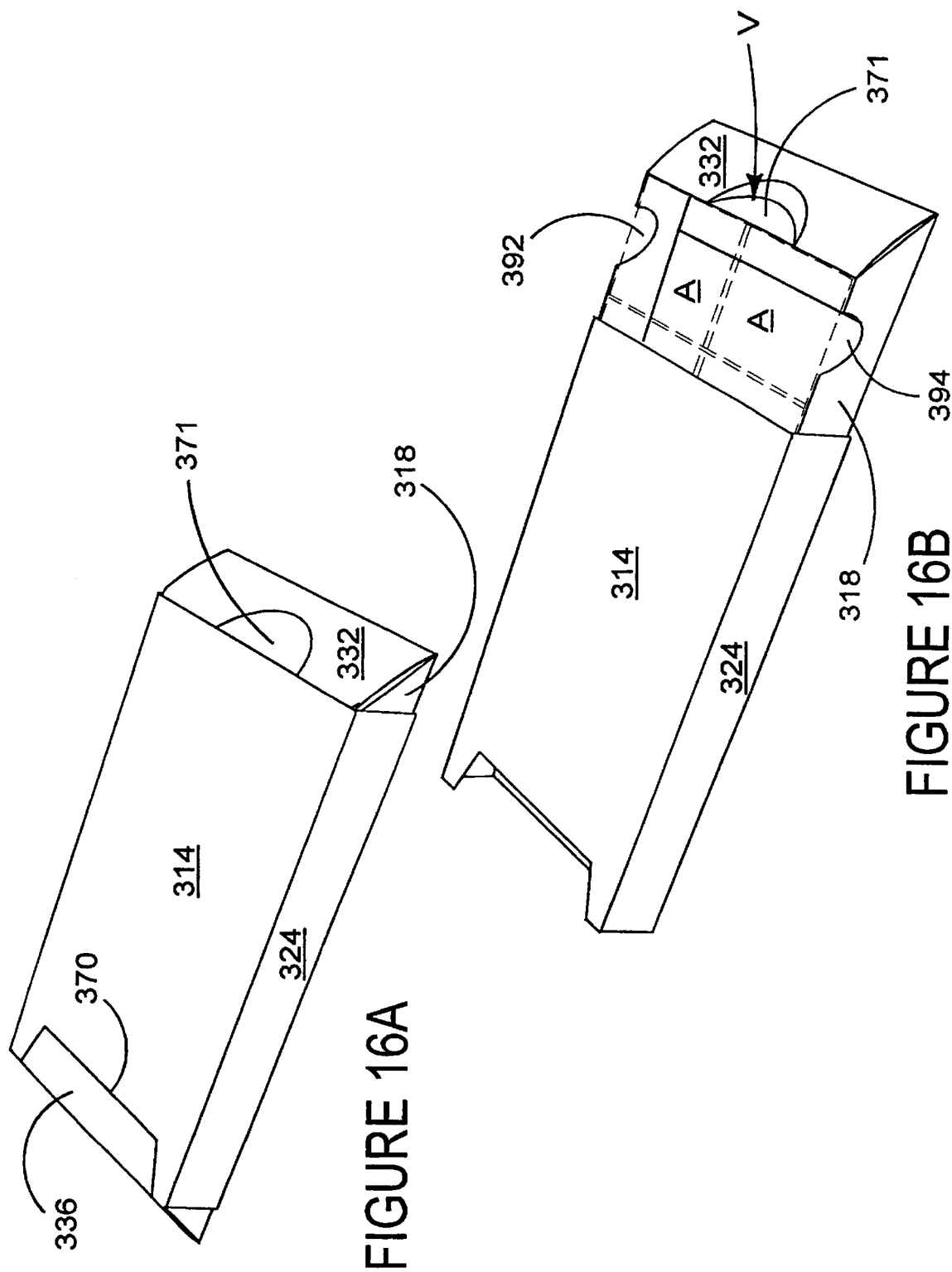

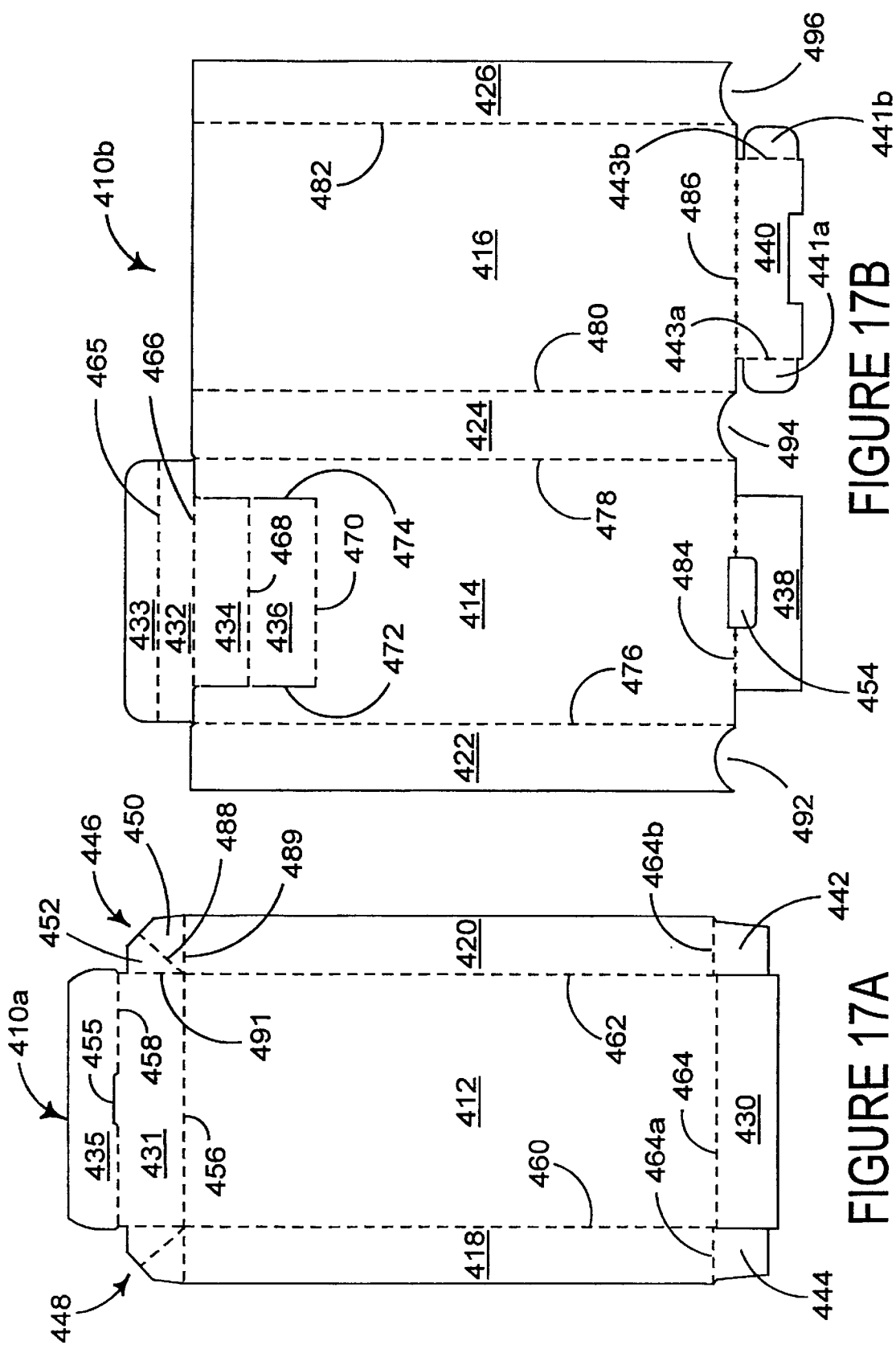

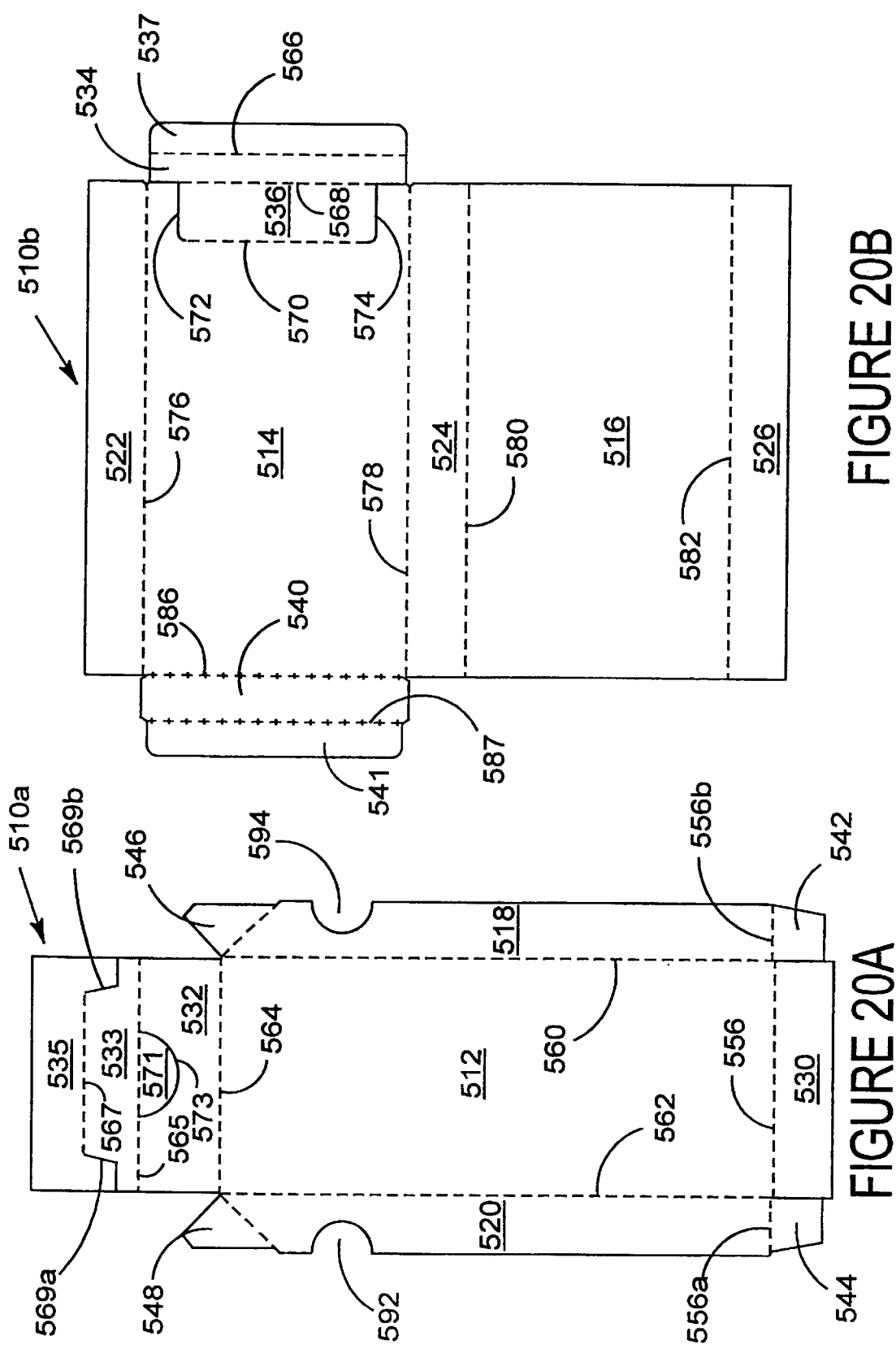

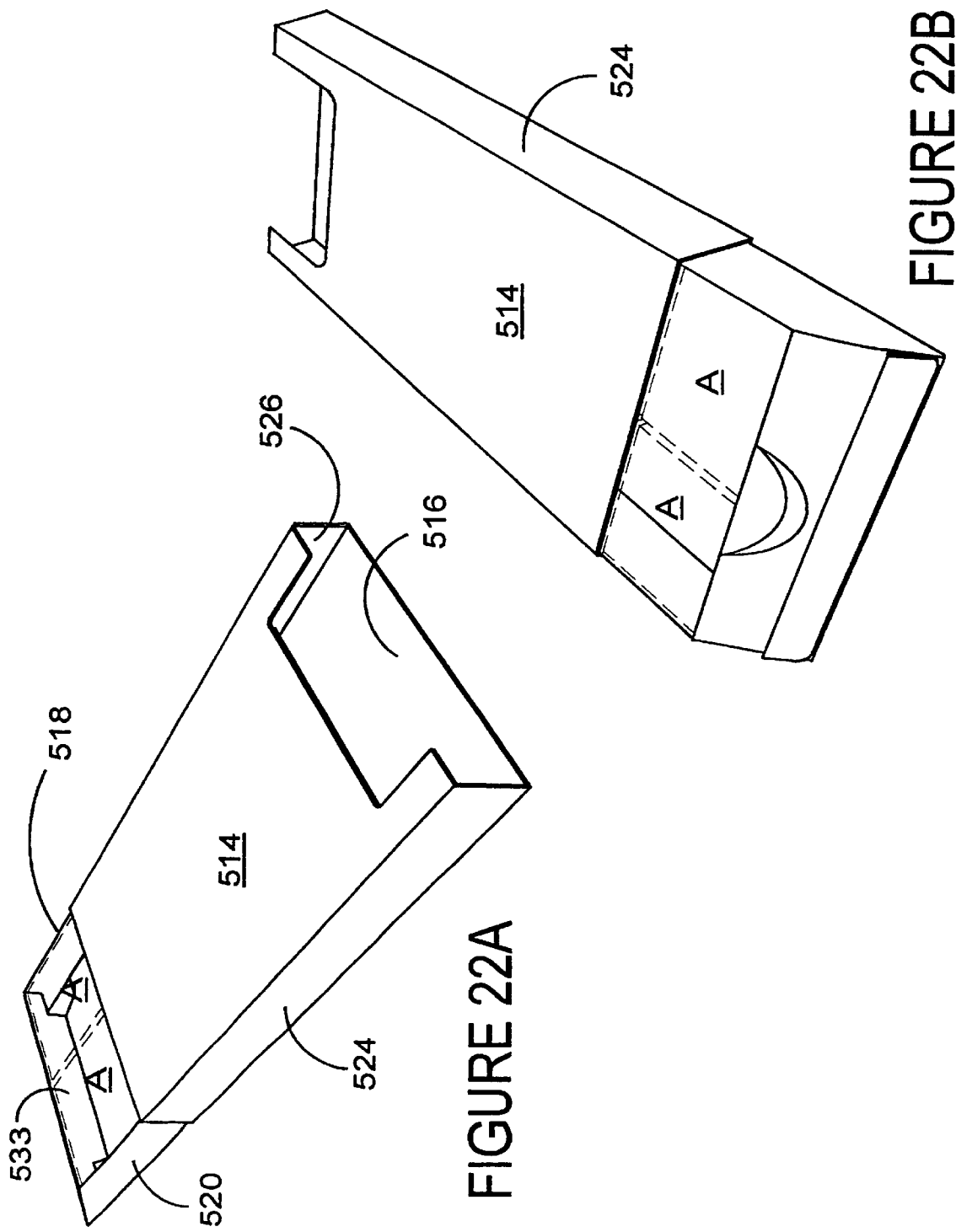

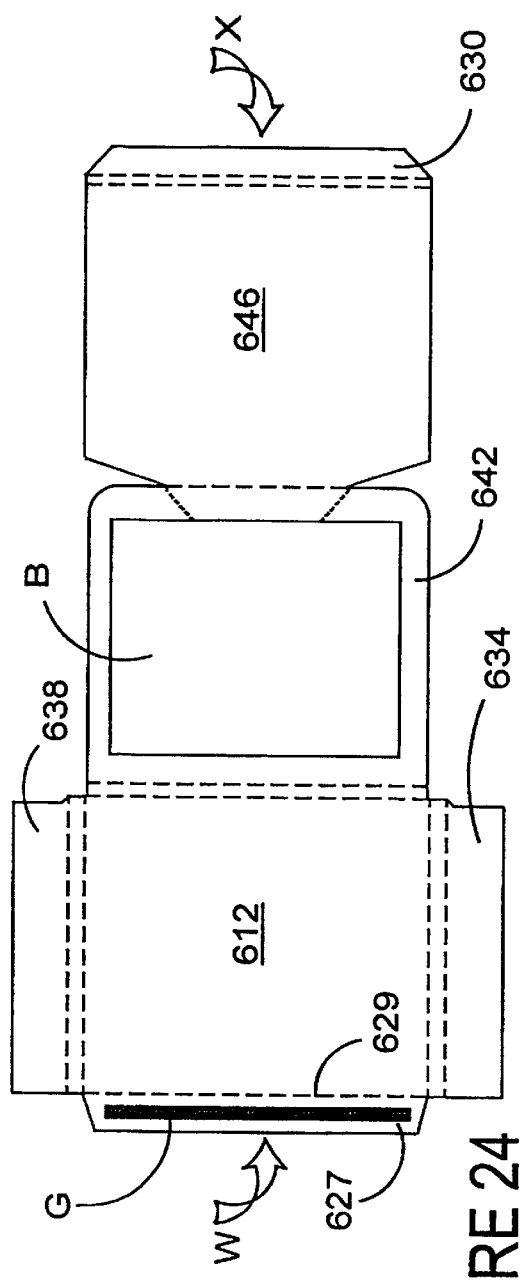
FIGURE 24
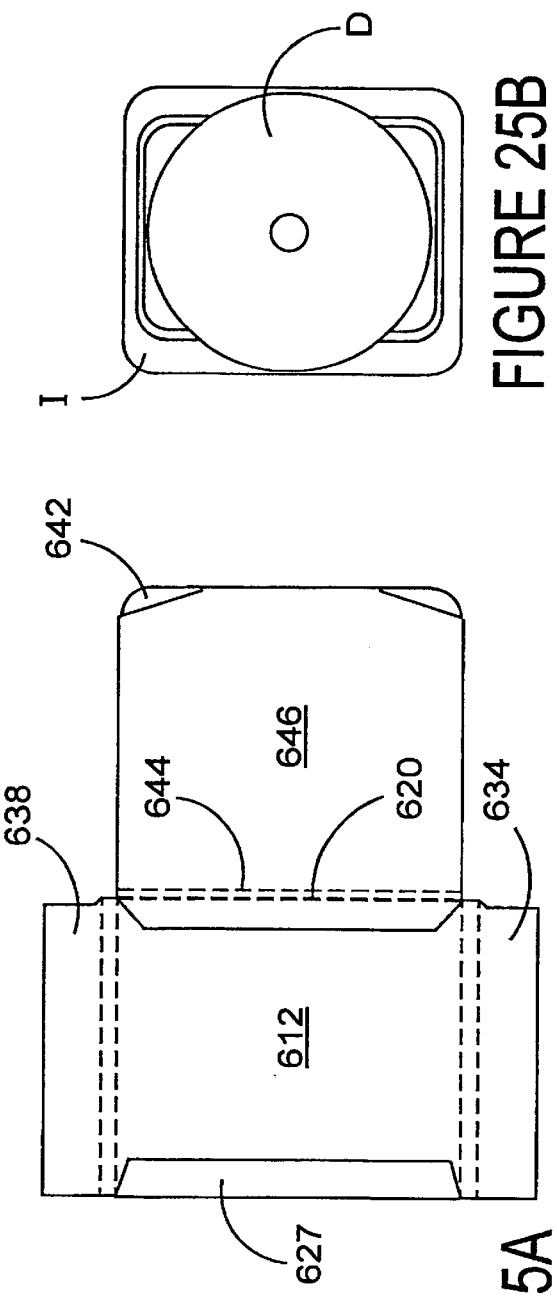
FIGURE 25A
FIGURE 25B

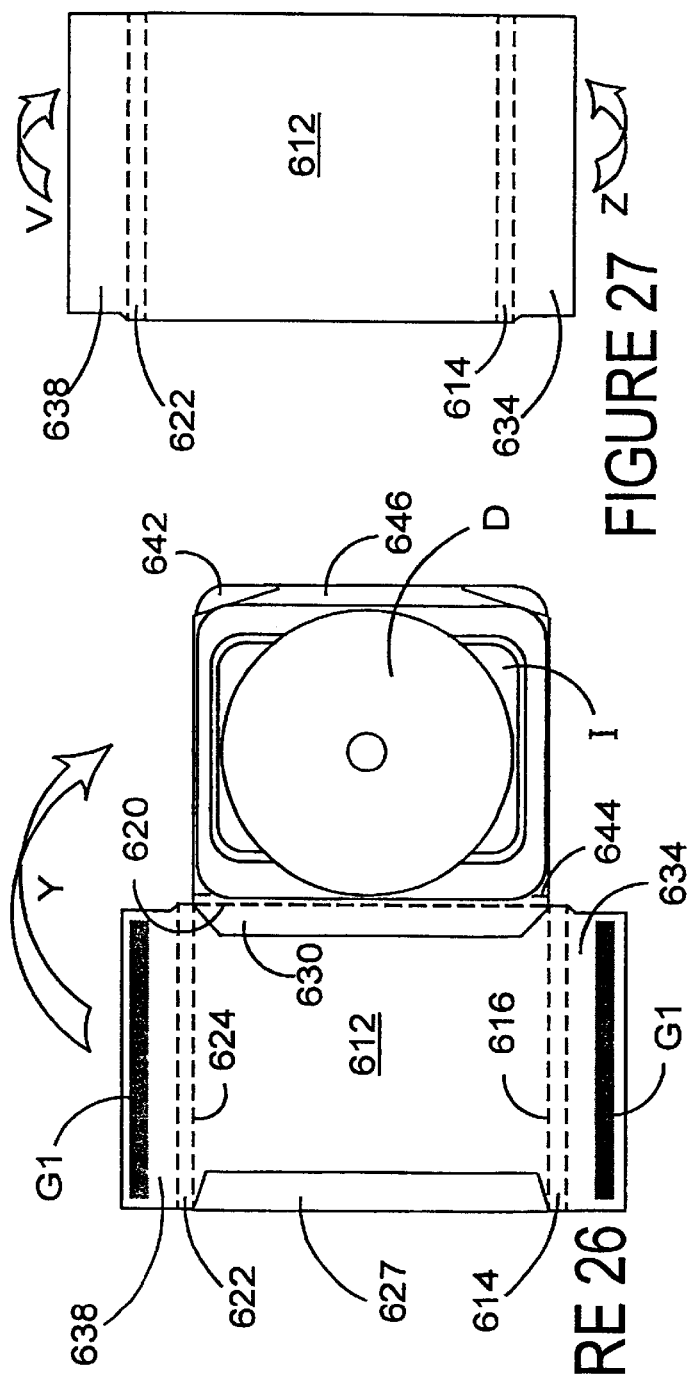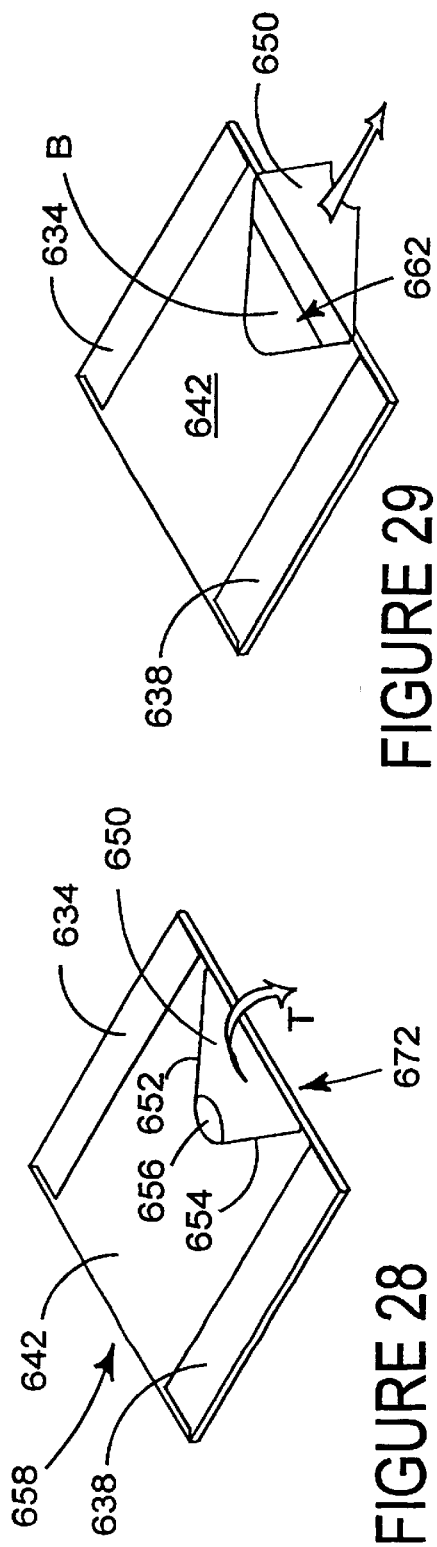

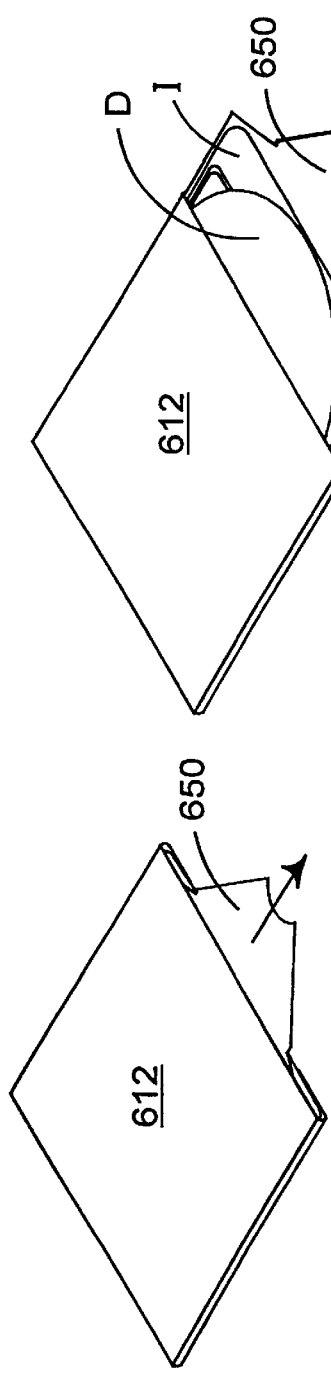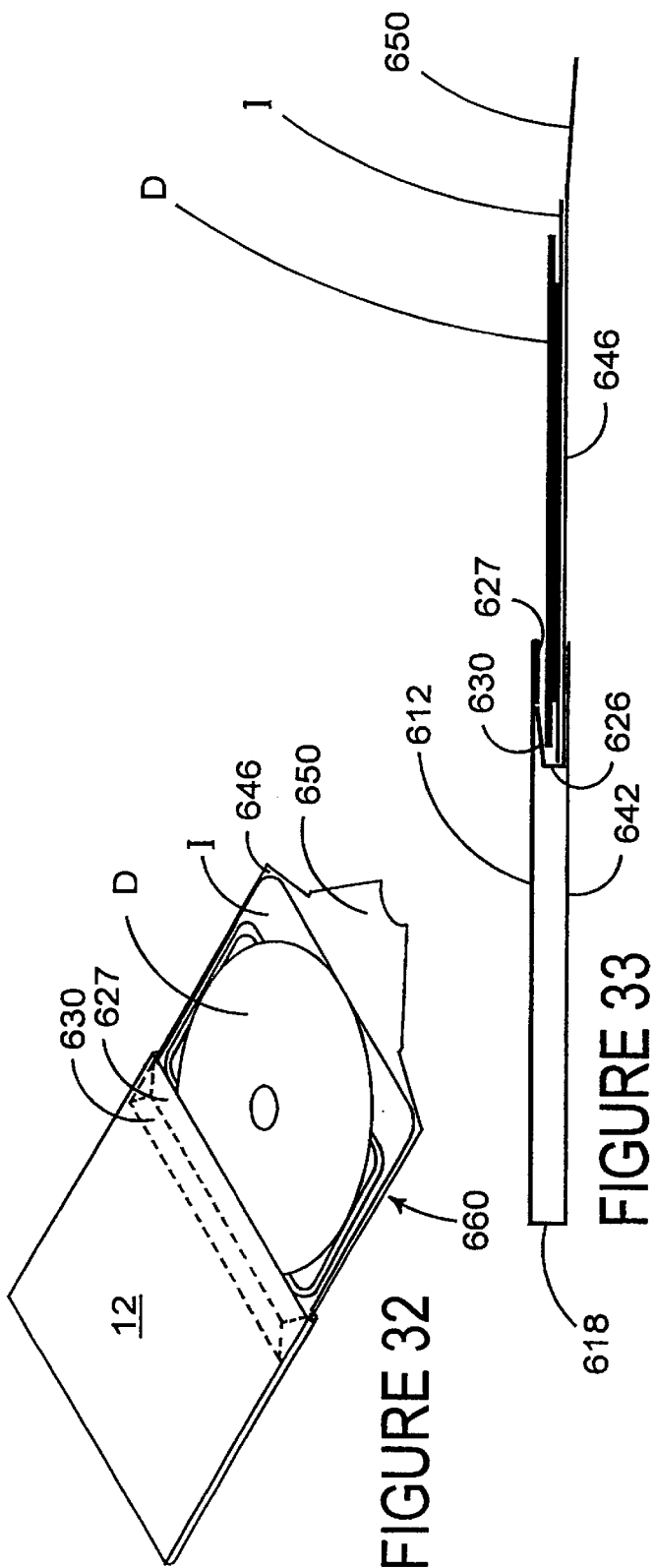

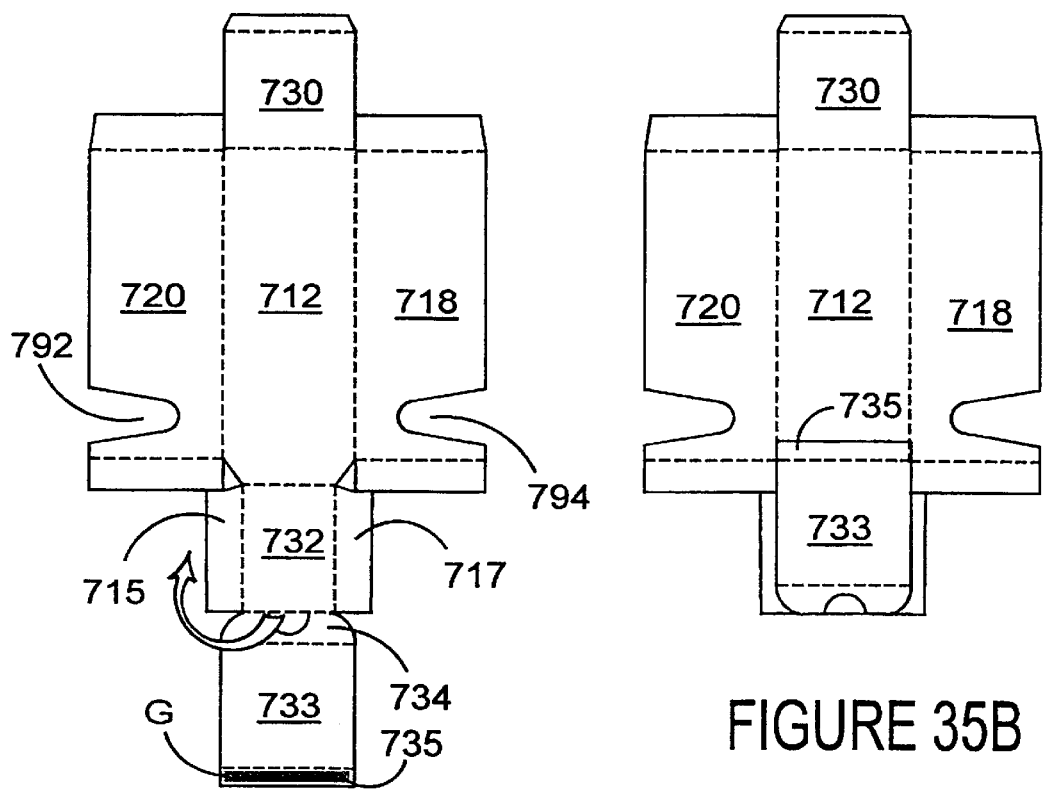
FIGURE 35A
FIGURE 35B
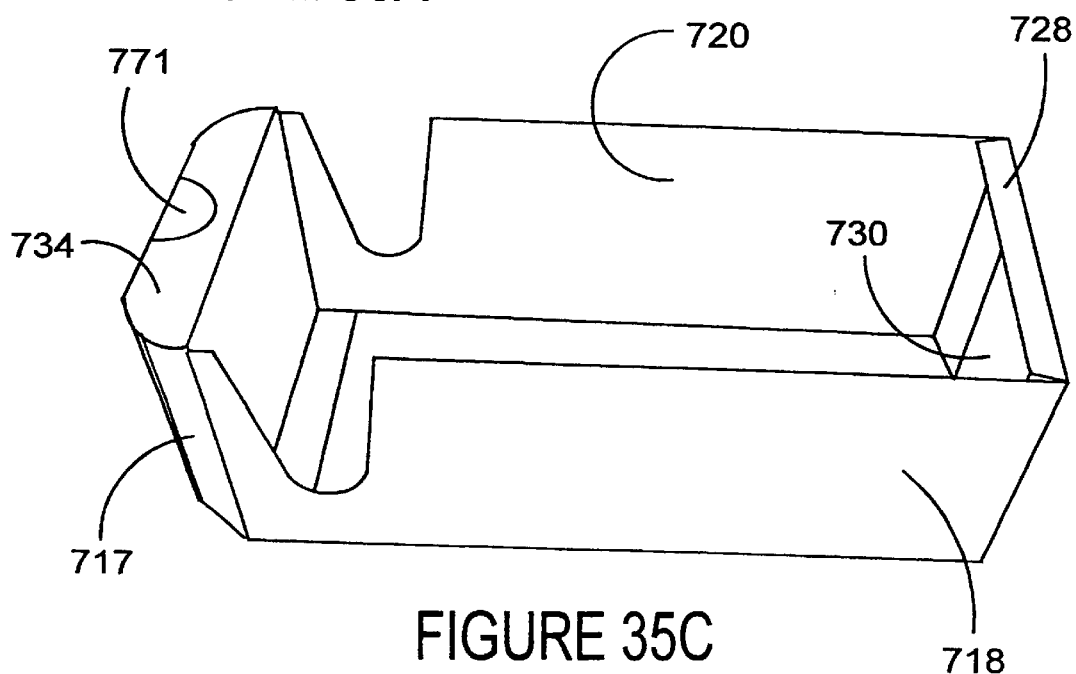
FIGURE 35C

CARTON AND CARTON BLANK This is a continuation of international application No. PCT/US00/27926, filed Oct. 10, 2000, which is hereby incorporated by reference.

BACKGROUND OF THE INVENTION

The invention relates to a carton or sleeve for accommodating one or more articles for example information discs, foodstuff or the like formed from one or more blanks of paperboard or other suitable foldable sheet material and more particularly to a sleeve capable of being formed into a sealed compartment comprising an inner tray and outer sleeve.

It is desirable for cartons containing articles such as foodstuff or information discs to be enclosed to protect the or each article. Furthermore, the carton should preferably be reclosable to allow it to be reused.

One example of reclosable sleeves formed from one or more blanks of cardboard is found in U.S. Pat. No. 3,078,030 which illustrates a carton having integral hinged top that it reclosable. The top is provided by a front cover panel and a spacer panel secured to one side of the front cover panel to interfit with a mating upper portion of the front panel of a box. Fastening means is formed from a detached double layer portion of the front panel. However, the detached portion is attached to the inside surface of the cover flap resulting in a stepped non-flat front surface.

In cartons where articles are positioned next to one another in abutment, it can be difficult to gain access to the interior of the carton. One known solution is to open the carton from the side or end but this is undesirable because it tends to destroy the integrity of the carton. Another solution is to use a tear panel with a pull tab which is undesirable because it can be inadvertently pulled or removed completely. Examples of this general carton type are illustrated in U.S. Pat. Nos. 2,122,480 and 3,735,914.

SUMMARY OF THE INVENTION

The present invention and its preferred embodiments seek to overcome or at least mitigate the problems of the prior art.

One aspect of the invention provides a carton for packaging one or more articles, for example frozen or chilled foodstuff, comprising an inner tray slidable within a tubular outer cover part wherein the inner tray is provided with a plurality of panels for forming a void and an aperture defined in one or more of the panels forming the void to enable a user to engage an edge of the aperture to facilitate the slidable movement. Preferably, a push tab may be provided which can be depressed into the void to reveal the aperture.

According to an optional feature of this aspect of the invention a tear panel connected to a panel of the outer cover part may conceal the aperture so that the tear panel must be removed before the aperture may be revealed. Preferably, the tear panel may be defined by a tear line which tear line extends into an adjacent carton wall of the outer cover portion to define a cutout in the adjacent carton wall when the tear panel is torn open, thereby to aid access to articles held in the carton.

According to another optional feature of this aspect of the invention the push tab may be hingedly connected to the tear panel.

According to another optional feature of this aspect of the invention the void may be further defined by an internal partition adapted to prevent the or each article from moving into the void. The internal partition may be provided by a support member connecting the top and bottom walls to protect the articles from being damaged. Preferably, the partition support member may be hingedly connected to the base wall and the push tab is foldable to be engaged with the support member to reclose the carton after the tear panel is torn open.

According to another optional feature of this aspect of the invention, the outer cover part may be provided by a plurality of panels forming a tubular structure.

According to a further optional feature of this aspect of the invention the inner tray may be connected to the outer cover part by a connecting panel arrangement to limit relative slidable movement therebetween. Preferably, the connecting panel arrangement may be struck from and hingedly connected to one of the panels forming the outer cover part.

The connecting panel arrangement for connecting the inner tray to the outer cover part may comprise a first panel secured to a section of an end wall of the inner tray, and a second panel hingedly interconnected to the first panel and to the outer cover portion, the first and second panels being arranged so as to limit relative movement of the inner tray and outer cover parts.

According to yet another optional feature of this aspect of the invention the outer cover part may have closed ends including a top, base and side walls, wherein the void is defined by slanted end wall of the outer cover part and the tray end wall to protect the contents of the tray from being damaged. Preferably, the slanted end wall may define an acute angle with the outer cover part bottom wall which the tray base wall overlies to support the contents thereon and the tray end wall extends upwardly from the tray base wall to its free end for engaging the junction between the slanted end wall and the shell top wall.

A second aspect of the invention provides a carton comprising an inner tray slidable within a tubular outer cover part wherein a panel is arranged to connect the inner tray to the outer portion and restrict relative movement therebetween wherein the inner tray and/or outer cover part comprising an end closure structure removable from the tubular structure to facilitate the slidable movement. Preferably, the end closure structure may comprise a flap hingedly connected to a first panel of the tubular structure along a weakened fold line, a slot being provided so as to interrupt the fold line, wherein an end panel of the inner tray portion is provided with a tab arranged to protrude through the slot.

According to an optional feature of the second aspect of the invention there may comprise a tab structure struck from an end panel of the inner tray. Preferably, the tab may be hingedly connected to the inner tray to define an aperture in the end panel, which aperture may be engaged by an end user of the carton.

According to another optional feature of the second aspect of the invention the end closure structure may comprise an outer end wall connected to a first panel of the outer portion along a weakened fold line, a slot being provided so as to interrupt the fold line, the tab being arranged so as to protrude through the slot.

A third aspect of the invention provides a carton comprising a connecting panel arrangement for connecting an inner tray to an outer cover part, which inner tray and outer part are relatively slidable, the arrangement comprising a first panel secured to a section of an end wall of the inner tray, and a second panel hingedly interconnected to the first panel and to the outer portion, the first and second panels being arranged so as to restrict relative movement of the inner and outer portions.

According to an optional feature of the third aspect of the invention the carton may be closed, the second connecting panel substantially overlies a further section of the end wall.

According to another optional feature of the third aspect of the invention the first panel may be hinged to the end wall section intermediate the upper and lower edges of the end wall to aid the hinged movement of the first and second panels during said slidable movement thereof.

According to yet another optional feature of the third aspect of the invention the end panel may be substantially vertical.

A fourth aspect of the invention provides a carton comprising an insert slidably received within a sleeve wherein the insert and the sleeve are joined together along at least one frangible connection so that the sliding movement of the insert is enabled by breaking the frangible connection.

Preferably, the frangible connection may comprise at least one tear line formed in the sleeve and is so constructed and arranged to define a pull tab in the sleeve wherein the pull tab is joined to the insert. More preferably, the pull tab may be joined to the insert along a fold line. Optionally, the fold line may interconnect the tab and one of the panels forming the insert wherein said one panel of the insert is disposed in face contacting relationship with the tab. Alternatively, the fold line may define an edge of one of the outer walls of the sleeve.

According to another optional feature of the fourth aspect of the invention the frangible connection may comprise two tear lines arranged with a finger aperture interposed therebetween so that the tear lines extend from the aperture to the fold line.

A fifth aspect of the invention provides a carton comprising an inner tray portion slidable within a sleeve wherein the sleeve comprises a retaining tab folded inwardly of the sleeve to restrict the sliding movement of the insert abutment with a panel of the insert at a predetermined position relative the sleeve. Preferably, the inner tray portion may comprise a stopper flap extending upwardly from the tray portion so adapted to abut said retaining tab at the predetermined position to restrict further relative movement therebetween.

According to an optional feature of the fifth aspect of the invention the retaining tab may be secured to an upper panel of the sleeve and wherein the stopper flap of the insert is hingedly connected to the distal end of the insert and is resiliently biased to abut the upper panel of the sleeve during the sliding movement of the insert.

A sixth aspect of the invention provides a blank for forming a carton comprising a base panel, opposed side and end panels hingedly secured to the base panel for forming an inner tray and a second blank comprising a top panel, opposed side panels and a base panel hingedly connected together to form a tubular outer cover portion wherein the inner tray is provided with a plurality of panels for forming a void within the set up tray and an aperture defined in one or more of the panels forming the void. Preferably, a push tab may be hingedly connected to an edge of the aperture.

According to an optional feature of the sixth aspect of the invention a tear panel connected to a panel of the outer cover part may conceal the aperture so that the tear panel must be removed before the aperture may be revealed. The tear panel may be defined by a tear line which tear line extends into an adjacent wall panel of the outer cover part to define a cutout in the adjacent wall panel when the tear panel is torn open. Preferably, the push tab may be hingedly connected to the tear panel.

According to another optional feature of the sixth aspect of the invention an internal partition panel may be connected to one of the panels forming the void.

According to yet another optional feature of the sixth aspect of the invention the inner tray may be connected to the outer cover part by a connecting panel arrangement to limit relative slidable movement therebetween in a set up carton. The connecting panel arrangement for connecting the inner tray to the outer cover part may comprise a first panel secured to a section of an end wall of the inner tray, and a second panel hingedly interconnected to the first panel and to the outer cover portion.

A seventh aspect of the invention provides a blank for forming a carton comprising an inner tray portion slidable within a tubular outer cover portion wherein a panel is arranged to connect the inner portion to the outer portion and restrict relative movement therebetween and the outer portion comprising an end closure structure removable from the tubular structure to facilitate the slidable movement in a set up carton.

Preferably, the end closure structure may comprise a flap hingedly connected to a first panel of the tubular structure along a weakened fold line, a slot being provided so as to interrupt the fold line, wherein an end panel of the inner tray portion is provided with a tab arranged to protrude through the slot in a set up condition. More preferably, there may comprise a tab structure struck from an end panel of the inner tray. Optionally, the tab may be hingedly connected to the inner tray to define an aperture in the end panel, which aperture may be engaged by an end user of the carton.

According to an optional feature of the seventh aspect of the invention the portion of the outer cover and the portion of the end panel may be secured together using glue. Preferably, the portion of the outer cover may be defined by a tear line.

An eighth aspect of the invention provides a blank for forming a carton comprising a plurality of panels for forming a sleeve including to a top panel, bottom panel, side and end panels hingedly connected together and an insert panel wherein the insert panel and one of the panels forming the sleeve are joined together along at least one frangible connection wherein the frangible connection comprises at least one tear line formed in the sleeve and is so constructed and arranged to define a pull tab in the sleeve wherein the pull tab is joined to the insert. The pull tab may be joined to the insert along a fold line. Optionally, the fold line may interconnect the tab and the insert panel wherein the insert panel is disposed in face contacting relationship with the tab in a set-up carton. Preferably, the fold lines may define an edge of one of the outer walls of the sleeve.

According to an optional feature of the eighth aspect of the invention the frangible connection may comprise two tear lines arranged with a finger aperture interposed therebetween so that the tear lines extend from the aperture to the fold line.

According to another optional feature of the eighth aspect of the invention top panel of the sleeve may further comprise a retaining tab hingedly connected thereto, which retaining tab is capable of being folded inwardly of the sleeve to restrict sliding movement of the insert panel at a predetermined position. There may further comprise a stopper flap extending upwardly from the insert panel that is so adapted to abut said retaining tab at the predetermined position to restrict further relative movement therebetween, when the carton is in a set up condition.

BRIEF DESCRIPTION OF THE DRAWINGS

Exemplary embodiments of the invention will now be described, by way of example only, with reference to the accompanying drawings in which:

FIGS. 13A and 13B are plan views of a two-part blank for forming a carton according to a preferred embodiment of the invention;

FIG. 15A is a perspective view of a carton formed from the two-part blank illustrated in FIGS. 13A and 13B in a set up and loaded condition;

FIG. 15B is a perspective view of the carton of FIG. 15A in which an inner tray of the carton has been partially pulled out to allow access to the contents of the carton;

FIG. 16A is a perspective view of the carton of FIG. 15A viewed from the opposite end thereof;

FIG. 16B is a plan view of the carton of FIG. 16A in which an inner tray of the carton has been partially pulled out to allow access to the contents of the carton;

FIGS. 17A and 17B are perspective views of a two-part blank according to another embodiment of the invention;

FIGS. 20A and 20B are plan views of a two-part blank for forming a carton according to a further embodiment of the invention;

FIGS. 22A and 22B are perspective views of the carton of FIG. 21A from opposite ends thereof in which an inner tray of the carton has been partially pulled out to allow access to the contents of the carton;

FIGS. 24 and 25A illustrate the blank of FIG. 23 shown during the preliminary folding process;

FIG. 25B is a plan view of an insert and disc contained to be held within the sleeve formed from the blank in FIG. 23;

FIGS. 26, 27 and 28 illustrate the insert being loaded and the final construction of the sleeve;

FIGS. 29, 30, 31 and 32 are perspective views of the sleeve shown in FIG. 28 during use, whereby the sleeve is opened to gain access to the article;

FIG. 33 is a cross section view of the sleeve shown in FIG. 32;

FIGS. 35A and 35B illustrate the blank of FIG. 34 shown during the preliminary folding process;

FIG. 35C is a perspective view of a fully erected tray formed from the blank of FIG. 34;

DETAILED DESCRIPTION OF THE PREFERRED EMBODIMENTS

Figure 1:
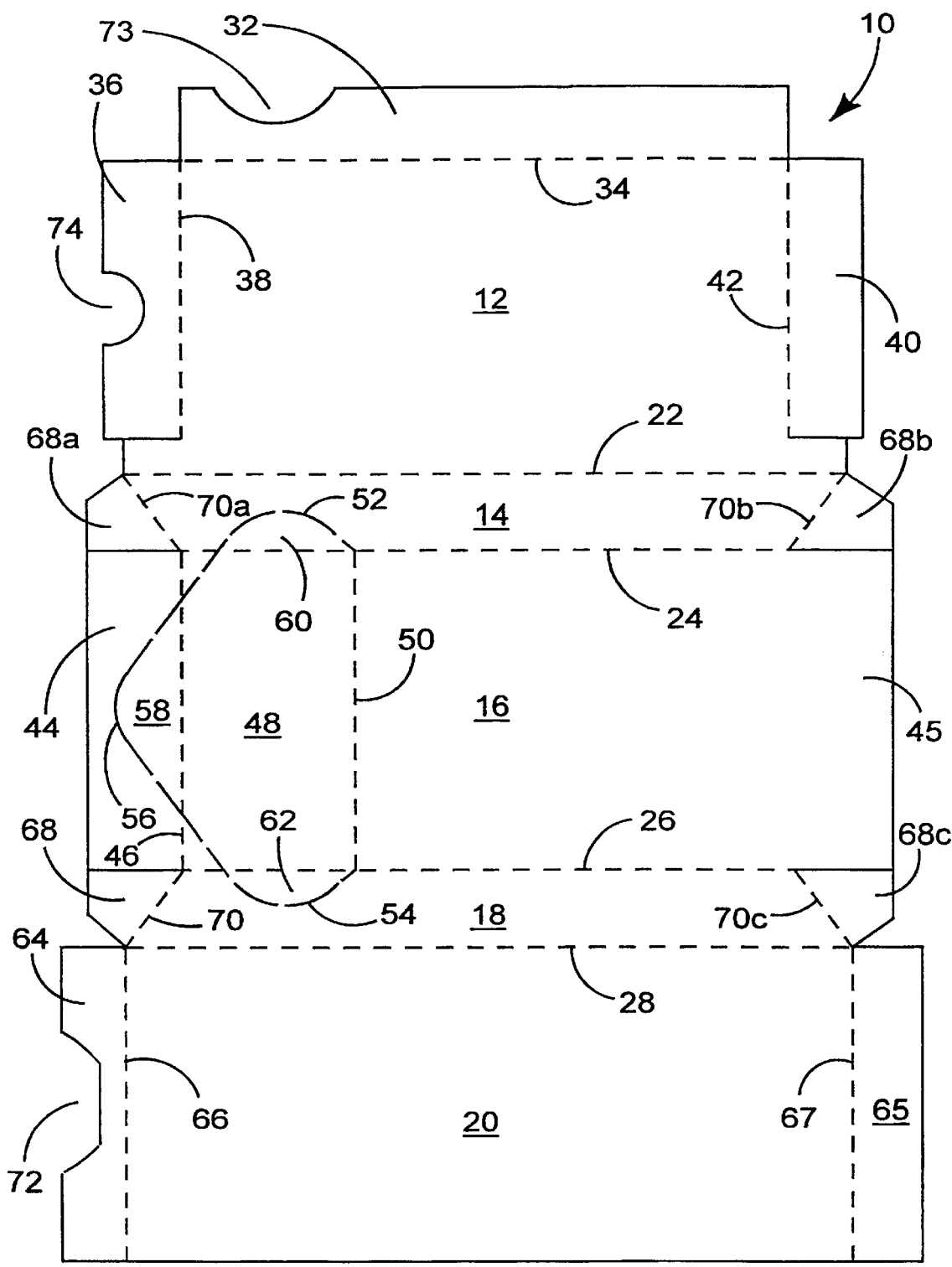
FIG. 1 is a plan view of a blank for forming a carton according to a preferred embodiment of the invention.

Referring to the drawings, and in particular FIG. 1, there is shown a blank 10 for forming carton made from one or more blanks of paperboard or similar foldable sheet material, for example plastic or the like. The blank 10 comprises a plurality of panels for forming a carton. In this embodiment, there comprises an inner base wall panel 12, first side wall panel 14, top wall panel 16, second side wall panel 18 and outer base wall panel 20 hingedly connected one to the next along fold lines 22, 24, 26 and 28 respectively. There may further comprise an inner second side wall panel 32 hingedly connected to the outer lateral edge of inner base wall panel 12 along fold line 34. In this embodiment, inner second side wall panel 32 corresponds substantially to the shape and size of outer second side wall panel 18, whereby a recess 73 is provided. It is envisaged that other shapes of the base, side and top wall panels can be employed, according to the shape and/or size of the articles to be contained.

In this embodiment, an inner tray I (FIG. 2) is constructed whereby there comprises inner side wall panel 32, inner base wall panel 12 and there may further comprise opposed end wall panels 36 and 40. It will be seen from FIG. 1 that end wall panels 36, 40 are hingedly connected along end edges of inner base panel 12 by fold lines 38 and 42 respectively. Preferably, the distance between fold lines 38 and 42 is less than the length of the outer base wall panel 20, so that a void can be formed, shown in FIG. 4A and described in more detail below.

Figure 3:
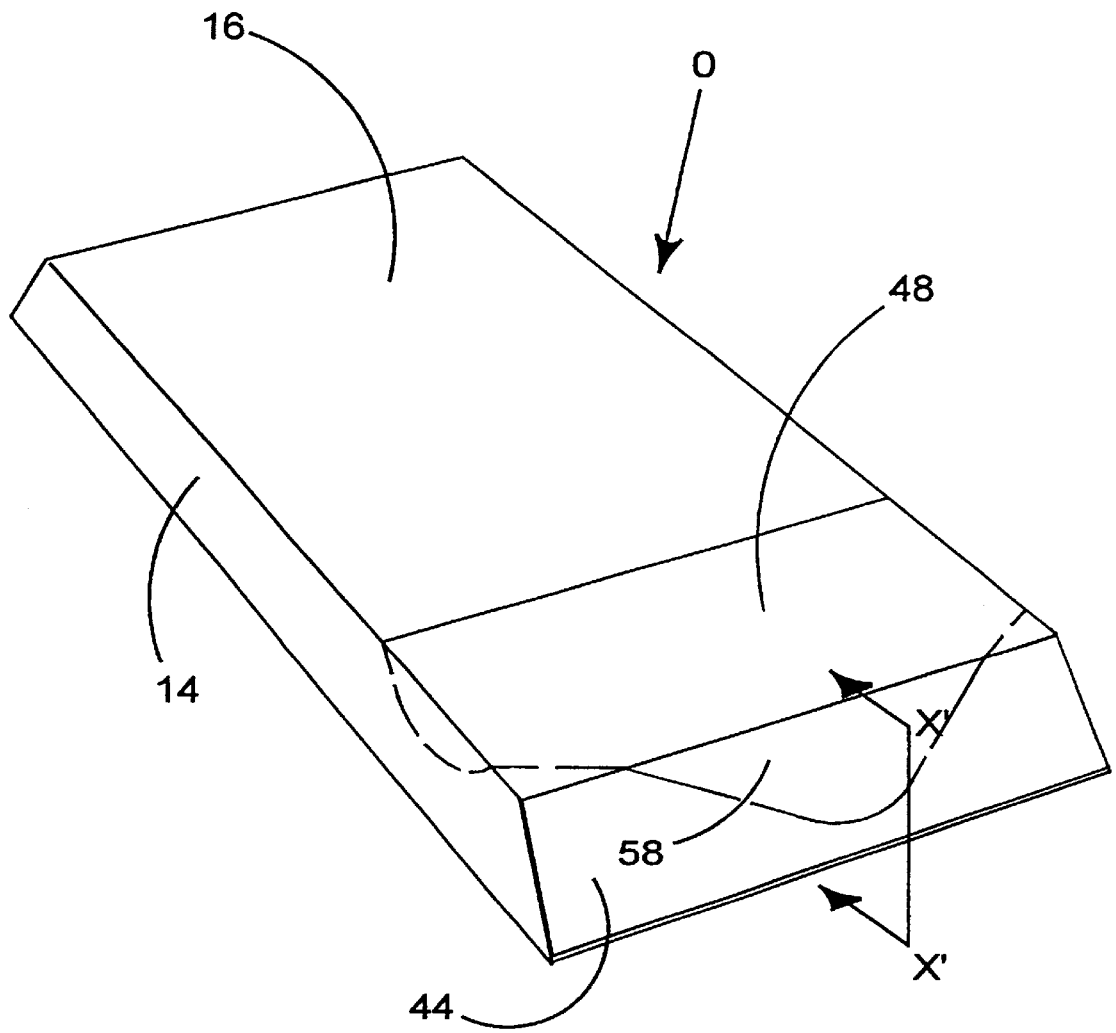
FIG. 3 is a perspective view of a carton formed from the blank illustrated in FIG. 1 in a set up and loaded condition.

The outer shell or sleeve O (FIG. 3) is also provided with an end wall panel structure, shaped to provide a carton which is, preferably, trapezoidal in shape, as shown in FIG. 3. Thus, the side walls are trapezoidal and at least one of the end walls is slanted. The end wall structures are provided by end wall panels 44 and 45. End panel 44 is hingedly connected to top panel 16 along interrupted fold line 46. In this embodiment, end wall panel 45 is an extension of panel 16 which is able to flex into its desired position rather than to be folded thereto. By flexing the panel, the top wall is strengthened because it is placed in tension.

There may further comprise an end flap 64 adapted to be placed in face contacting relationship with end panel 44, which flap 64 is hingedly connected to base wall panel 20 along fold line 66. Similarly, a further end flap 65 may be provided that is hingedly connected to the opposing end edge of base wall panel 20 along fold line 67, and can be folded to be placed in face contacting arrangement with end panel 45. There may further comprise securing flaps 68*a*, 68*b*; 68, 68*c*, hingedly connected to opposing side wall panels 14 and 18 by fold lines 70*a*, 70*b*; 70 and 70*c* respectively. Fold lines 70 are, preferably, at an acute angle with respect to their adjacent fold lines 22 and 28 so that in a set up condition the trapezoidal shape can be formed.

An access structure is provided to the carton. In this embodiment, there comprises a reclosable tear flap in which a tear panel 48 is hingedly connected to one of the panels, for example, the top panel 16, by fold line 50 and is defined in part by frangible lines 52 and 54, which extend into an adjacent panel, for example, end panel 44. Frangible lines 52 and 54 are interconnected by a further frangible line 56 formed in end panel 44. Frangible line 56 is shaped to define in part a tab 58. Tab 58 is connected to tear panel 48 by fold line 46. Preferably, tear panel 48 also extends into first and second side wall panels 14 and 18 to define outer portions 60 and 62 respectively. In use, outer portions 60 and 62 are separated from the adjacent side walls 14, 18 to reveal an aperture in each side wall. Because end flap 64 is in face contacting relationship with end wall panel 44, a recess 72 is provided to allow tab 58 to pass into the void unimpeded by the flap 64.

Figure 2:
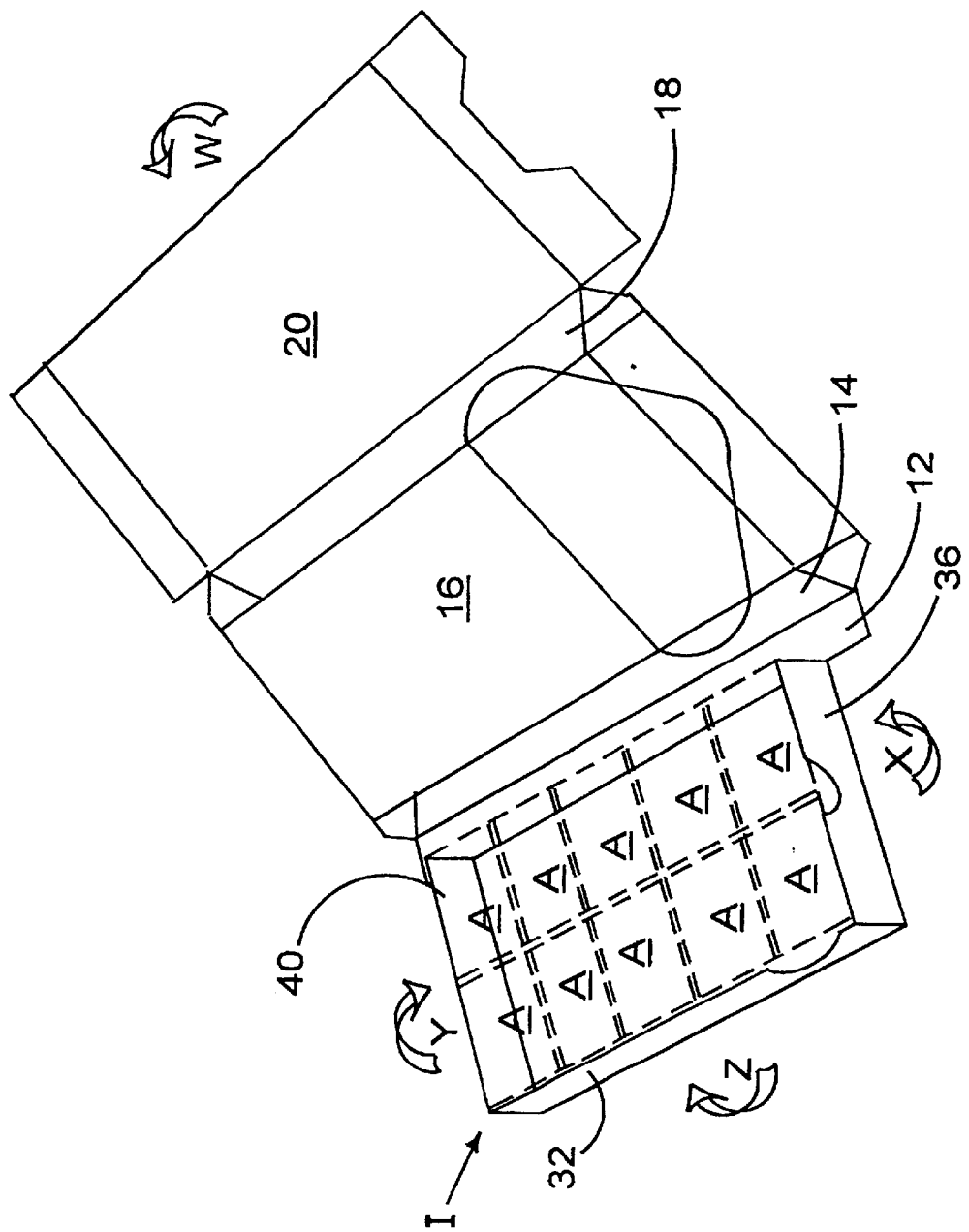
FIG. 2 illustrates the blank of FIG. 1 shown during the folding process.

Turning to the construction of the carton from the blank shown in FIG. 1, the articles A are loaded onto the inner base panel 12 and a tray structure I is formed (FIG. 2) as follows: opposed end wall panels 36 and 40 are folded inwardly about fold lines 38 and 42 respectively into a substantially perpendicular relationship with inner base wall panel 12 in directions X and Y. Inner side wall panel 32 is likewise folded into substantially perpendicular relationship with base wall panel 12 about fold line 34 in direction Z. Thus, the articles are held in a secure position by the inner side wall panel 32 and end wall panels 36, 40, as shown in FIG. 2.

Thereafter the outer wall panels of the carton are folded in direction W about the inner tray structure I to form the outer shell or sleeve O (FIG. 3), by folding the first side wall panel 14 along fold line 22, the top wall panel 16 along fold line 24, second side wall panel 18 along fold line 26 and the base wall panel 20 along fold line 28, to be wrapped around the inner tray structure I. Inner and outer side wall panels 32 and 18 are secured together by glue or suitable means known in the art.

Figure 4A:
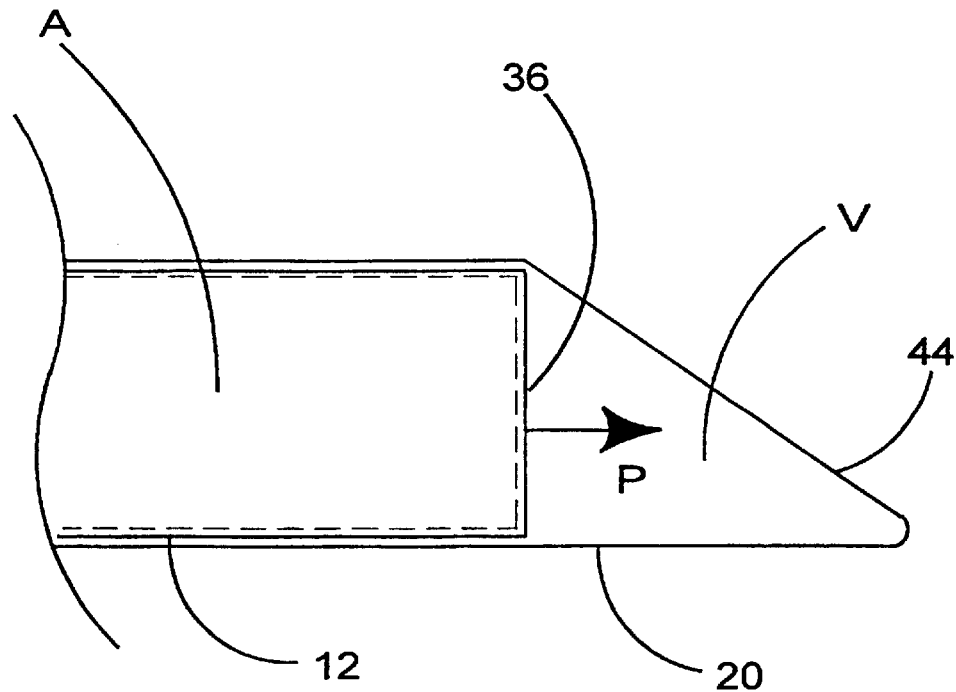
FIG. 4a is a cross sectional view through X—X shown in FIG. 3 showing the end wall construction and void.

The end wall structures are then formed by folding end panel flaps 64 and 65 about fold lines 66 and 67 respectively, inwardly, into an angular relationship with respect to outer base panel 20. Preferably, the end flaps 64 and 65 abut the end walls 36 and 40 respectively of the inner tray to maintain the end walls in a substantially perpendicular relationship with respect to base panel 12. Thereafter, securing flaps 68, 68*a*, 68*b* and 68*c* are folded inwardly along fold lines 70 to 70*d*. End wall panel 44 is then folded downwardly about fold line 46 and end panel 45 is flexed downwardly; thereby to abut the respective securing flaps. End wall panel 44 and end panel 45 are secured to the adjacent securing flaps 68, 68*a*; 68*b*, 68*c* and, preferably, to inner end flaps 64, 65 thereby to form a void at each end of the carton. The void V is illustrated in FIG. 4A. Despite the voids V, the inner end wall panels 36 and 40 are prevented from folding in an outward direction P because they abut the outer end wall panels 44 and 45 and so the articles A are prevented from moving about within the tray I. The carton is in its completed form with articles, for example foodstuff, held within the tray, as shown in FIG. 3.

Figure 4B:
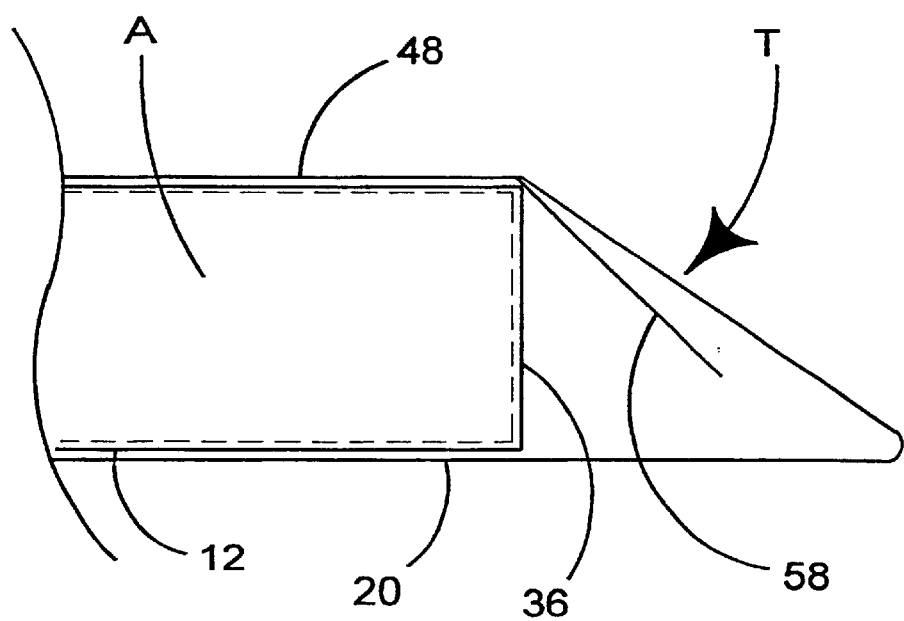
FIG. 4b is a cross sectional view through X—X, shown in FIG. 3, as the tear panel is separated from the remainder of the carton.
Figure 5:
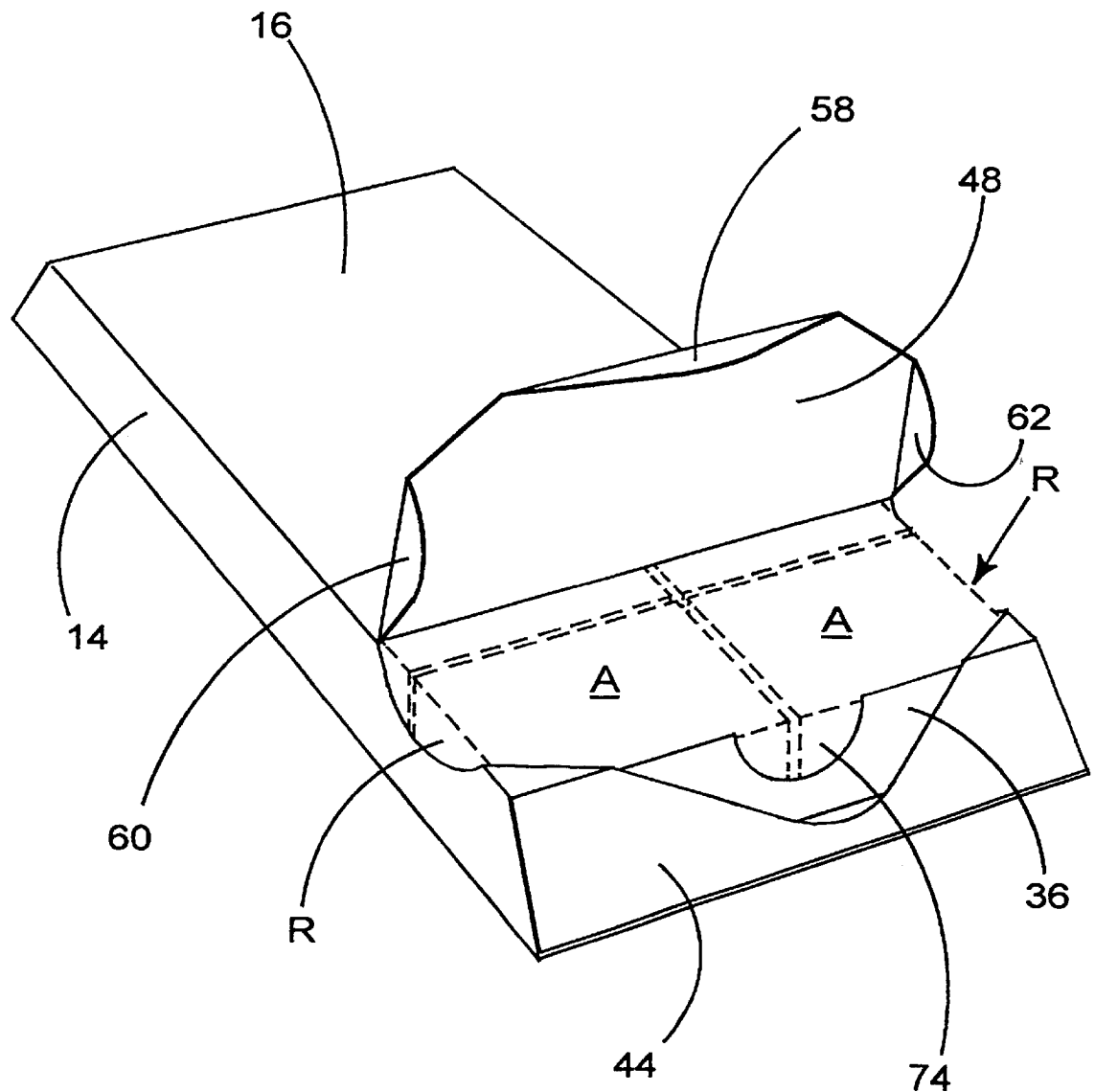
FIG. 5 is a perspective view of the carton illustrated in FIG. 3 with the tear panel separated from the remainder of the carton.

In order to gain access to the interior of the carton, a user presses tab 58 in an inward direction, T, as shown in FIG. 4B which is separated from end wall panel 44 along frangible line 56. The tear panel 48 is then separated from the remaining panels forming the carton by pulling tear panel 48 in an upward and outward direction to tear it along frangible lines 52 and 54 to reveal the contents of the carrier, as shown in FIG. 5. In those embodiments with outer portions 60 and 62, they too are separated to reveal recesses R in the side walls. The recesses R make it easier to remove articles from the carton.

One advantage of forming an end wall structure with a void V, is that the inwardly displaced tab 58 and the user's finger that manipulates the tab 58 are received in the void V and therefore do not damage, or otherwise physically affect, the articles within the inner tray structure I.

Figure 6:
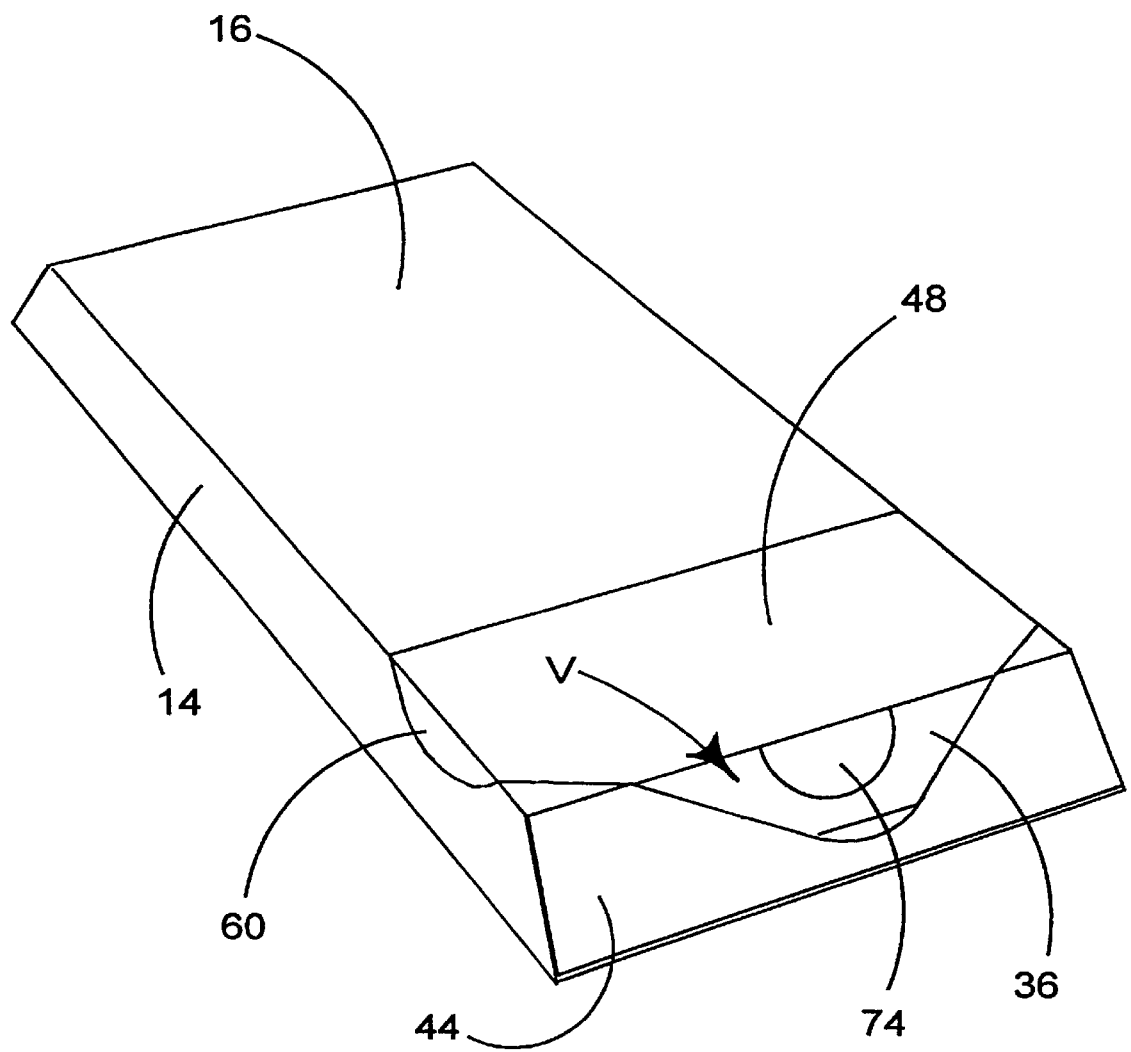
FIG. 6 is a perspective view of the carton as shown in FIG. 4 in which the tear panel is reclosed.

In this embodiment, it is possible to reclose the tear panel 48 by folding along fold line 50 back to a co-planar relationship with the top panel 16. Tab 58 is folded into a substantially perpendicular relationship with panel 48 along fold line 46, so that it can be placed within the inner tray I, shown in FIG. 6. Thus, the carton is capable of being reclosed by relative sliding movement between the end wall panel 36 of the tray and tab 58. The recess 74 provides access to the tab 58 and articles A.

Figure 7:
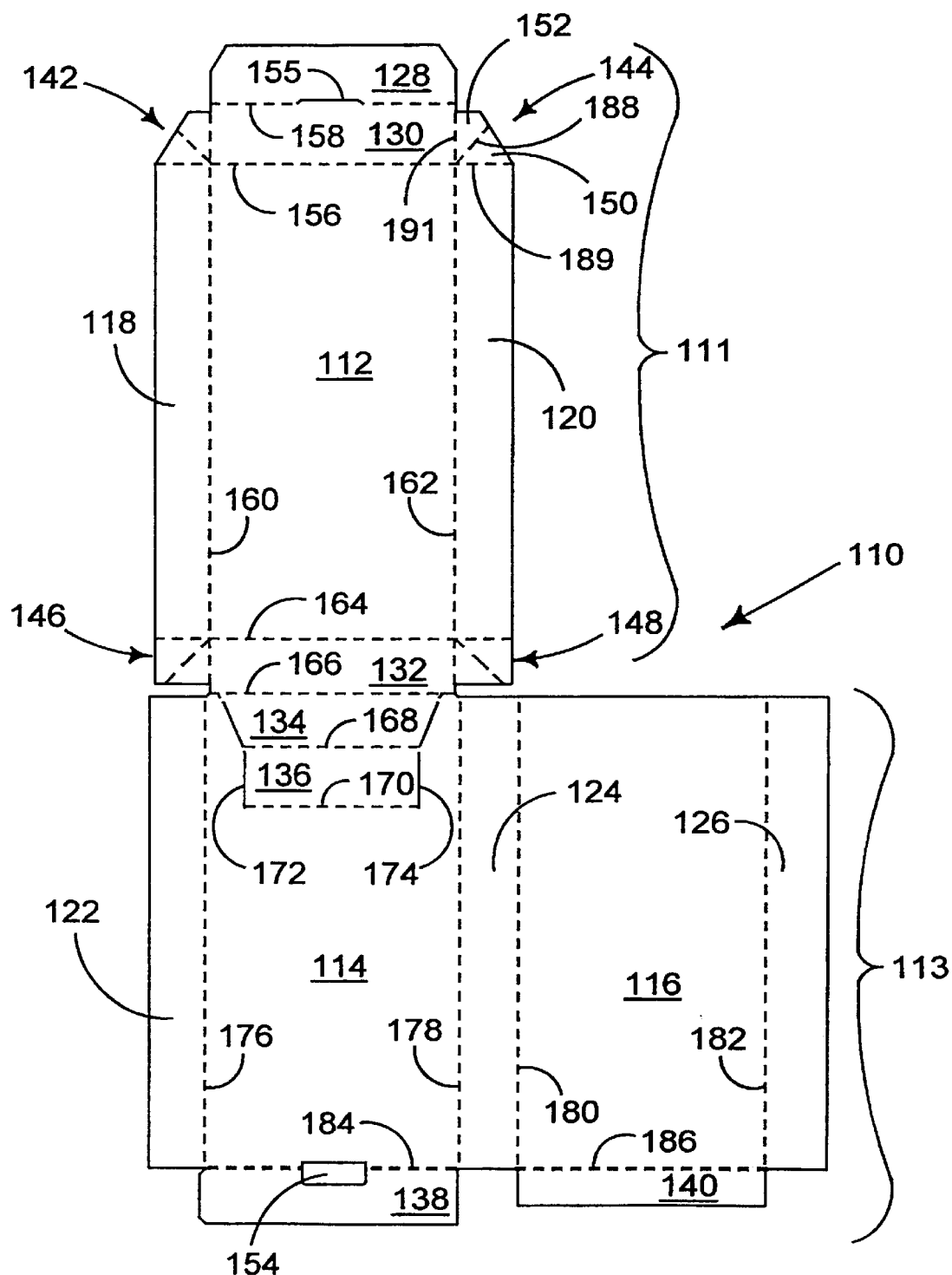
FIG. 7 is a plan view of a carton blank according to a second embodiment of the present invention.

Referring now to FIGS. 7 and 12 there is shown second and third embodiments of the blank for forming the outer sleeve and inner tray. The second embodiment is shown in FIG. 7 as a one part blank, although it is envisaged that the blank could be two parts, as shown in FIG. 12 that illustrates the third embodiment.

Turning again to the second embodiment, and in particular to FIG. 7, there is shown a blank 110, having a tray portion 111 and a cover portion 113. The tray portion 111 comprises a tray base panel 112 hingedly interconnected to tray side panels 118 and 120 along fold lines 160 and 162 respectively. There may further comprise opposed tray end panels 130 and 132 that are hingedly interconnected to opposed end edges of the base panel 112 along fold lines 156 and 164 respectively. Gusset arrangements 142, 144, 146 and 148 further hingedly interconnect adjacent edges of the tray end and side panels 130, 132 and 118, 120. In this embodiment, each gusset arrangement is similarly configured and, therefore, only arrangement 144 is described in further detail.

Arrangement 144 comprises a first gusset panel 150 hingedly connected to tray side panel 120 along fold line 189 which, in this embodiment, is an extension of fold line 156. Similarly, second gusset panel 152 is hingedly connected to tray end panel 130 along fold line 191, which in this embodiment, is an extension of fold line 162. First and second gusset panels 150, 152 hingedly connect together along fold line 188.

As is illustrated in FIG. 7, fold line 188 intersects with fold lines 189 and 191 at the corner of tray base panel 112. It is, however, envisaged that in alternative embodiments, a portion of one, or both of gusset panels 150, 152 may be cut away, adjacent the corner of tray base panel 112, so as to facilitate the folding of the gusset arrangement 144 during erection of the carton, and subsequently by the end user.

In alternative embodiments, it is anticipated that fold lines 189 and 191 may not extend parallel to fold lines 156 and 162 respectively such that trapezoidal cartons may be formed. Of course, other known gusset arrangements can be used instead without departing from the scope of invention.

A tuck-in flap 128 is hingedly connected to the end edge of tray end panel 130 along fold line 158. To ease the tucking-in procedure by an end user, at least one corner of flap 128 may be bevelled. Fold line 158 is advantageously interrupted by a cut such that a thumb tab 155 is formed that protrudes slightly into flap 128.

In this embodiment the opposing end flap 132 is hingedly connected to an upper cover panel 114 via first and second connecting panels 134, 136 along fold lines 166 and 168 respectively. Second connecting panel 136 is hingedly connected to upper cover panel 114 along fold line 170.

The connecting panels 134 and 136 are preferably struck from upper cover panel 114 and the side edges thereof are advantageously defined by frangible lines 172 and 174 which may be mutually divergent along at least a portion of their extent. In alternative embodiments, it is however envisaged that the frangible lines 172, 174 may be replaced by cut lines and the cut/tear lines may be co-extensive with a portion of the side edges of the upper cover panel 114.

The remainder of the cover portion of the blank 110 comprises first and second side cover panels 122 and 124 hingedly connected to the side edges of the upper cover panel 114 along fold lines 176 and 178 respectively.

An end cover panel 138 is hingedly connected to the end edge of upper cover panel 114 along weakened fold line 184. Fold line 184 is preferably interrupted by slot 154 arranged so as to co-operate with thumb-tab 155 when the blank is erected into a carton.

In this embodiment, a base cover panel 116 is hingedly connected to side cover panel 124 along fold line 180. The series of panels is completely by a further side panel 126 hingedly connected to cover panel 116 along fold line 182, which together with side panel 122 forms a composite side wall panel when the blank is erected to form a carton.

A further end cover panel 140 is preferably hingedly connected to an end edge of base cover panel 116 along weakened fold line 186.

Figure 12A:
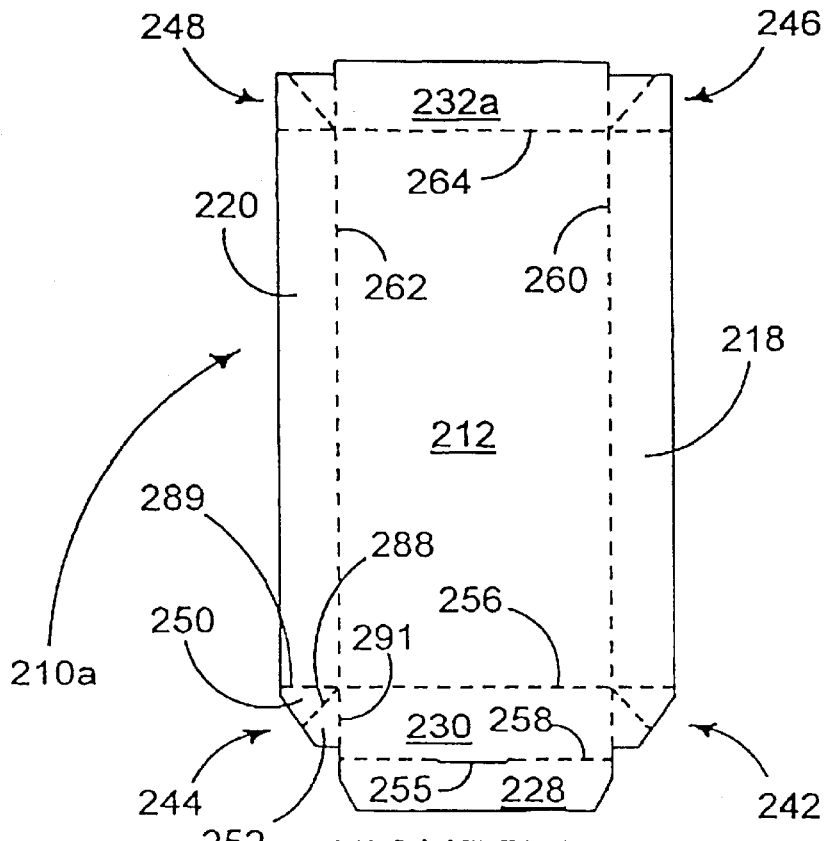
FIGS. 12A and 12B are plan views of a two part blank according to another embodiment of the present invention.
Figure 12B:
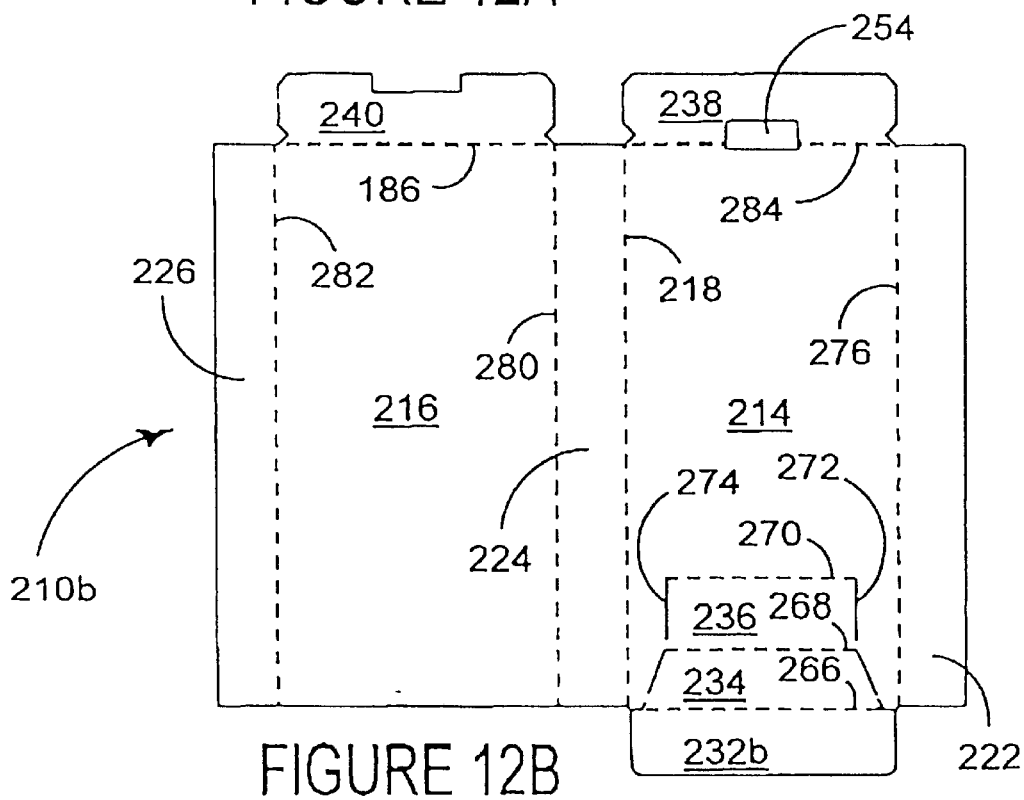

Referring now to FIGS. 12A and 12B, as an alternative to the use of a single blank 110, the carton may be constructed from two separate blanks. Like numerals have, where possible, been used for like parts, with the addition of the prefix "2" and therefore only the differences from the embodiment shown in FIG. 7 are described in any greater detail.

In this embodiment, the tray portion has been constructed from a first blank 210a, and the cover portion from blank 210b. To connect blank 210a to blank 210b, tray end panel 232a is placed in a face contacting relationship with securing panel 232b, and the two panels are secured together by glue, or other suitable means known in the art, thereby forming a composite tray end wall panel. The tray construction process may then proceed as outlined in the embodiment of FIG. 7, and the fully erected carton operates in a substantially similar manner. The use of a two part blank may, in some instances, simplify the mechanisation of the carton construction process, as well as permitting differing materials (e.g. differing grades of paperboard) to be used for the tray and the cover, thereby minimising the cost of producing each carton.

The construction of the second embodiment shown in FIGS. 7 to 11 will now be described. Articles are placed on the tray base wall panel 112. Tray side and end wall panels 118, 120 and 130, 132 are folded out of alignment with tray base panel 112 along their respective fold lines 160, 162 and 156, 164 into a substantially perpendicular relationship thereto. Gusset arrangements 142, 144, 145 and 148 are preferably arranged to be disposed inwardly of the side and end panels 118, 120, 130 and 132. Gusset arrangements are preferably secured to either tray end panel 132 or their respective tray side panels 118 and 120 using glue or other means known in the art to maintain the tray portion 111 in a set-up condition. Gusset arrangements 142 and 144 are, however, secured to side panels 118 and 120 respectively, so as to permit access to the contents of the carton when erected. Tuck-in flap 128 is subsequently folded out of alignment with end panel 130 so as to be in a substantially parallel and spaced arrangement with tray base panel 112.

Upper cover panel 114 is then, in this embodiment, folded along fold line 166 so as to be in substantially parallel and in spaced relationship with tray base panel 112; a portion of upper cover panel 114 overlies tuck-in flap 128. Cover side and base panels 122, 124, 126 and 116 are then preferably folded out of alignment with their respective neighbouring panels along fold lines 176, 178, 180 and 182 so as to form a tubular structure around tray portion 111 with base cover panel 116 in face contacting relationship with tray base panel 112. In this embodiment, tray side panel 126 is secured to tray side panel 122 using glue, thereby forming a composite side wall panel. In other classes of embodiment, alternative securing means known in the art may be used.

Figure 8:
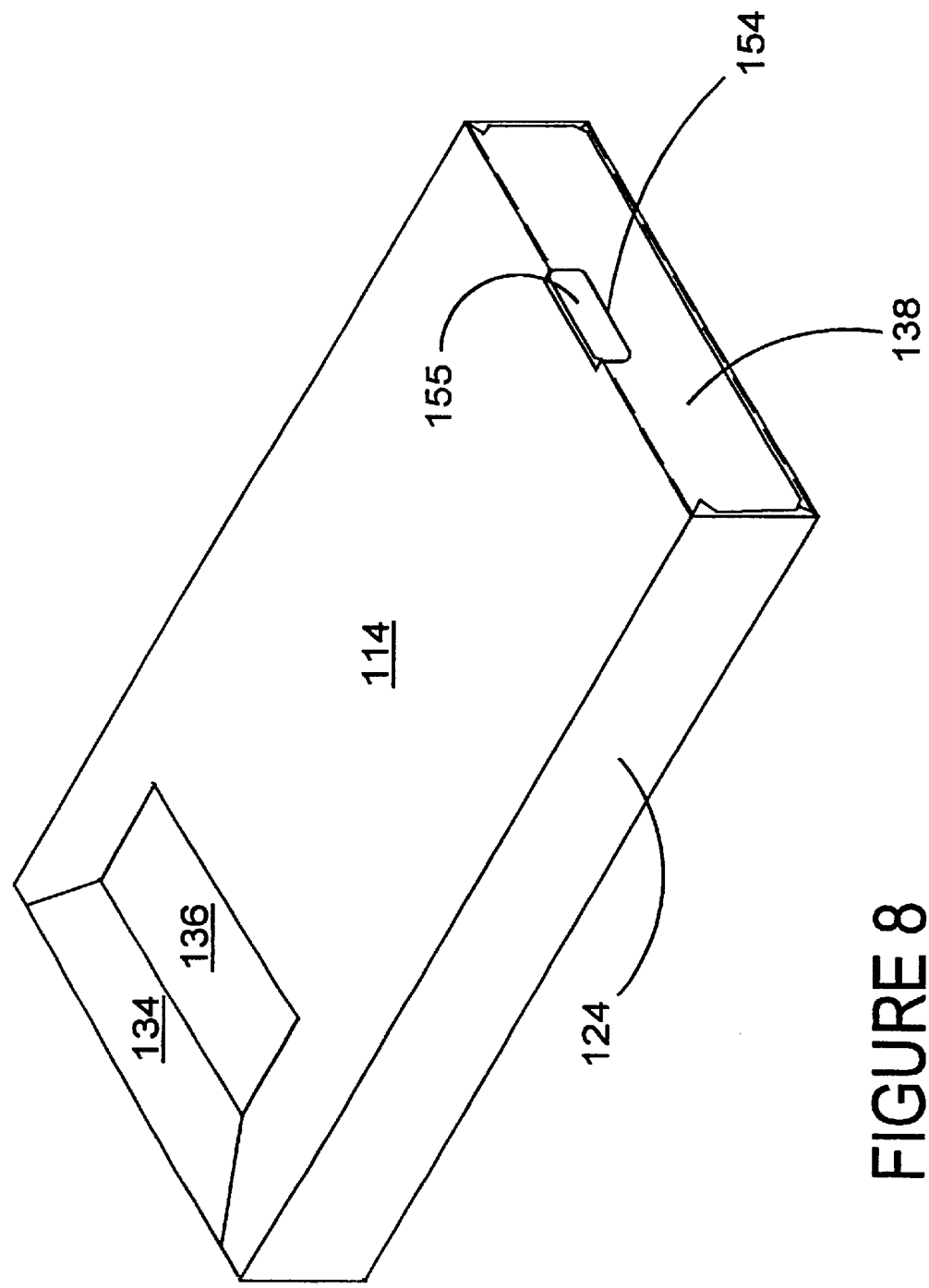
FIG. 8 is a perspective view of a carton formed from the blank of FIG. 7.

Finally, cover end panels 138 and 140 are folded into a substantially perpendicular relationship with upper and base cover panels 114 and 116 respectively along fold lines 184 and 186 such that end panels 138 and 140 are in face contacting relationship with each other and may be secured together by glue, or other means known in the art, to form a composite cover end panel which is in face contacting relationship with tray end panel 130. Thus, tab 155 now protrudes through slot 154 as is illustrated in FIG. 8, which shows the carton in a fully set up condition.

Figure 9:
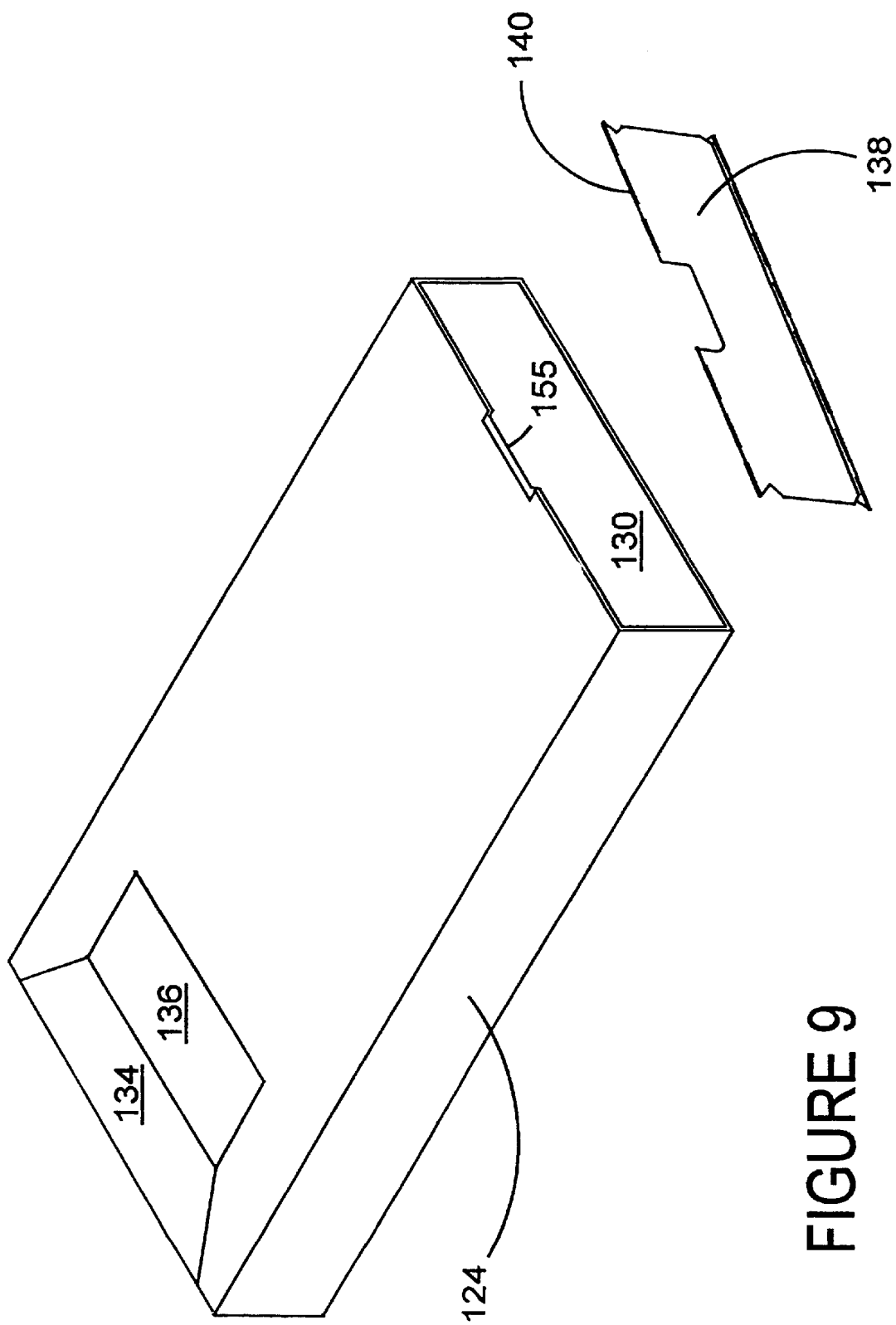
FIG. 9 is a perspective view of the carton of FIG. 8 in which an end panel has been removed.

Referring to FIG. 9, in order for the end user to gain access to the interior of the carton, composite cover end wall comprising panels 138 and 140, must first be removed by tearing along weakened fold lines 184 and 186. This may advantageously be achieved by the user engaging thumb tab 155, thereby simultaneously tearing the composite panel along fold line 184 and folding tray end panel 130 about fold line 156, such that the carton is part opened, shown in FIG. 10.

Figure 10:
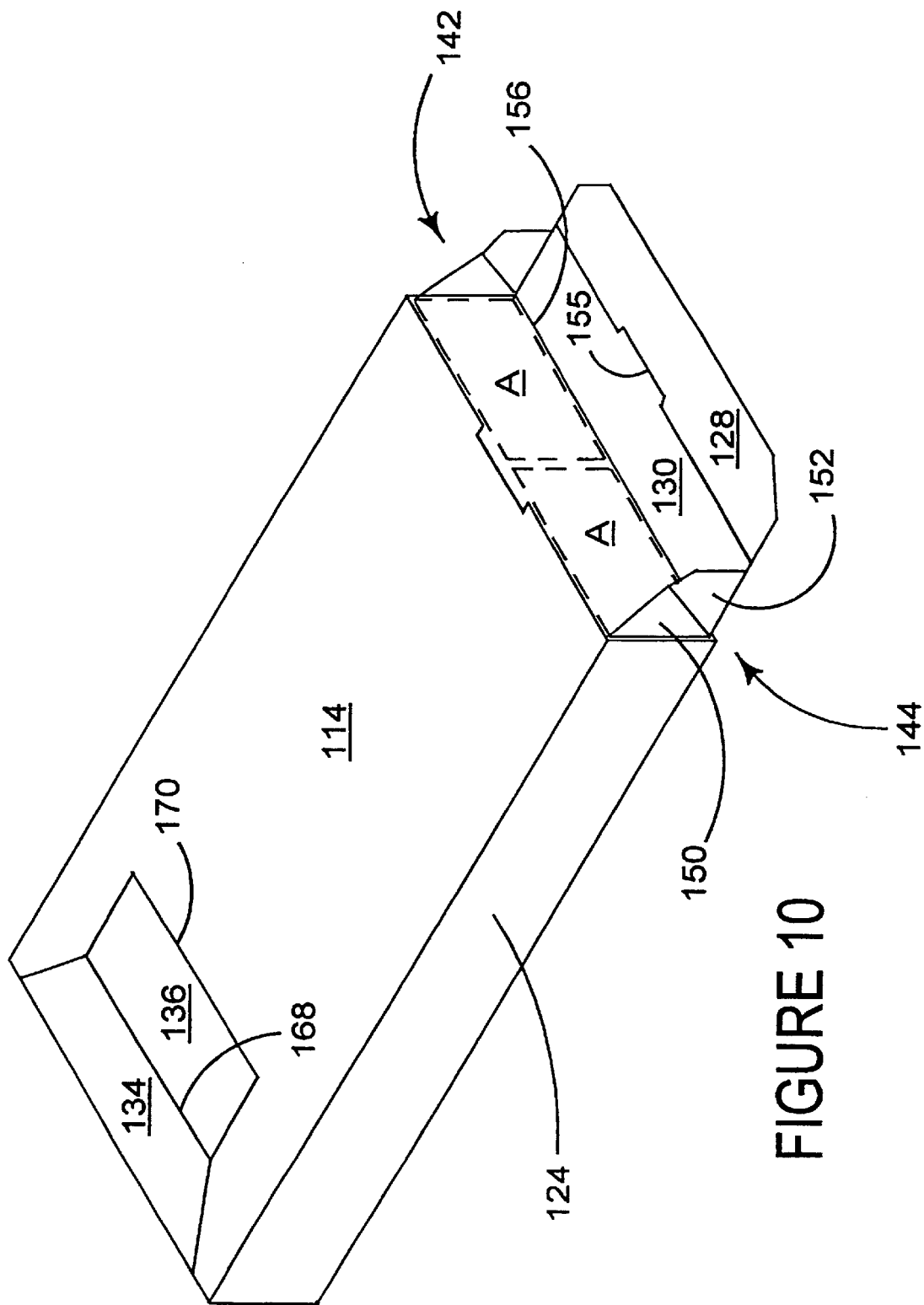
FIG. 10 is a perspective view of the carton of FIG. 4 in which an end wall structure has been opened.

It will be seen from FIG. 10 that gusset arrangements 142 and 144 prevent tray end panel 130 being folded beyond a position co-planar with tray base panel 112 to assist removal of the articles. In alternative classes of embodiment, in which gusset arrangement panels 142 and 144 are not provided, such a restriction would not exist.

Figure 11:
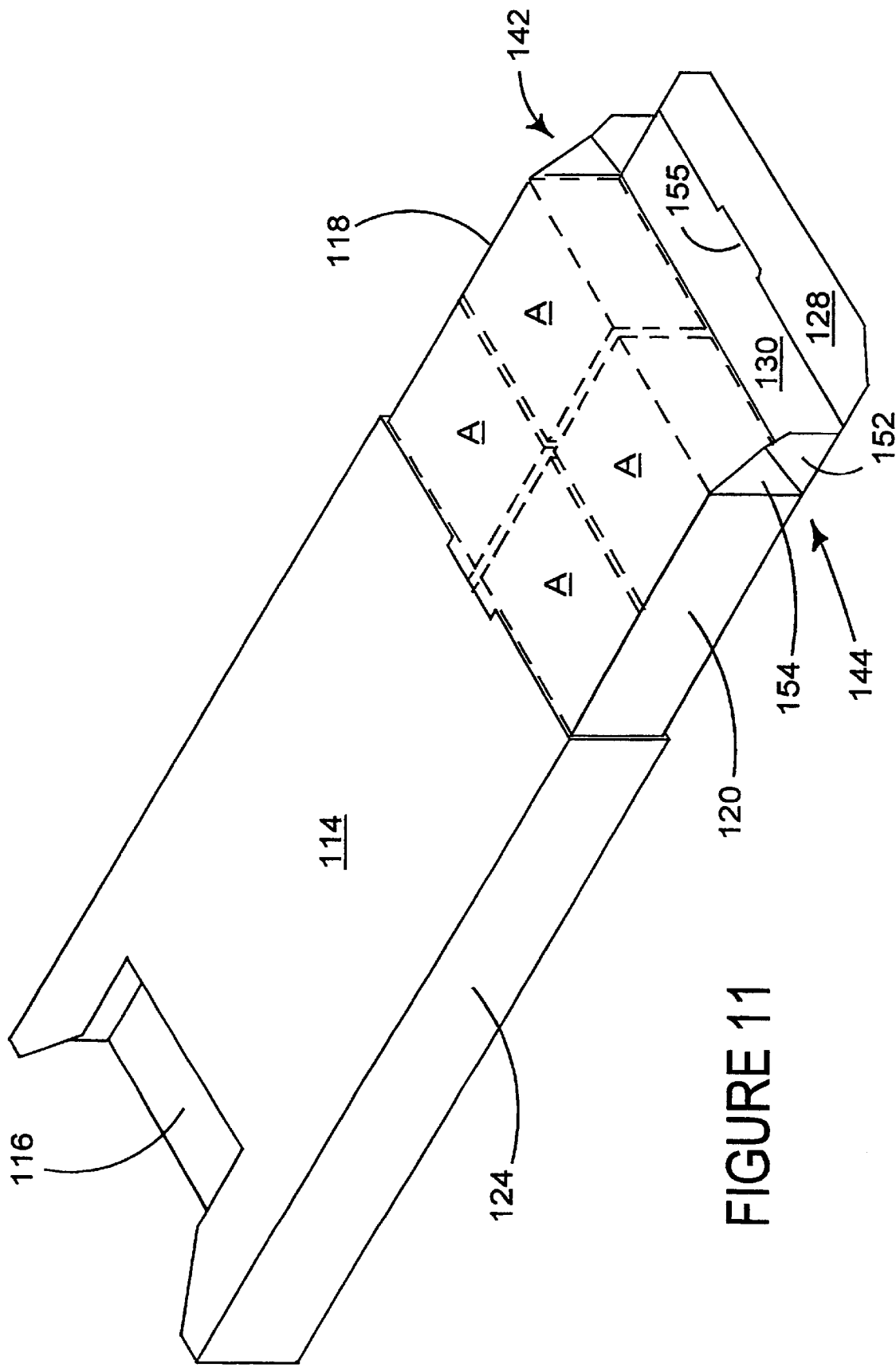
FIG. 11 is a perspective view of the carton of FIGS. 9 and 10 in which an inner tray of the carton has been partially pulled out to allow access to the contents of the carton.

Although articles A can be viewed and retrieved from within the carton in the state illustrated in FIG. 10, it is desirable for the tray portion 111 to slide out of cover portion 113, as illustrated in FIG. 11. In one class of embodiments, during the sliding motion, connecting panels 134 and 136 become detached from, and move out of alignment with upper cover panel 114 until a relative position of the tray portion and cover portion is reached, in which the connecting panels 134 and 136 restrict further movement, and articles A may be accessed more easily. Beneficially, this ensures the tray does not become separated from the outer cover because it is not particularly easy to re-insert the tray. In other embodiments, the maximum extent of the relative positions may be altered by altering the size and/or number of connecting panels provided.

If the end user wishes to re-close the carton, the above outlined steps may be reversed, and the tray re-closed by tucking-in panel 128 intermediate upper cover panel 114 and an article present in the tray.

The third embodiment of FIG. 12 is constructed and functions in a similar manner to the second embodiment of FIG. 7 and is not described in any greater detail.

The fourth embodiment of carton shown in FIGS. 13A and 13B is formed from a two part blank, although it is envisaged that the blank could alternatively be constructed form a single part blank. One blank defines a tray part 310a comprising a base panel 312, opposed side wall panels 318, 320 hingedly connected to the base wall panel 312 along fold lines 360 and 362 respectively, and opposed end wall structures.

A first end wall structure includes panels for forming a void, the purpose of which is described in more detail below. Thus the first end wall structure may comprise in series a first securing panel 328, a first strut panel 329 and first end wall panel 330, hingedly connected along fold lines 359 and 358 respectively. First end wall panel 330 is connected to base panel along fold line 356. Similarly, a second end wall structure also includes panels for forming a void. The second end wall structure may comprise in series a second securing panel 335, a second strut panel 333 and second end wall panel 332 hingedly connected along fold lines 367 and 365 respectively. Second end wall panel 332 is connected to base panel along fold line 364.

Recesses 392 and 394 are preferably provided in the side panels 320 and 318 to allow user's fingers to easily grasp an article held in the tray. In some embodiments, gusset panels 342, 346, 344 and 348 are provided to secure the end and side panels together, whereby they are hingedly interconnected to end edges of the tray side panels 318, 320 respectively. In this embodiment, each gusset panel is hingedly connected to the side panels 318, 320 along fold lines 356a, 356b, 364a, 364b, the fold lines being angled acutely in relation to corresponding side panel fold lines 360, 362. In alternative classes of embodiment, the angle may be adjusted, or an alternative gusset panel configuration used without departing from the scope of the invention.

A push tab 371 defined by cut line 373 and fold line 365 is provided in one of the panels forming the void. The push tab 371 is provided on the outer panel 332 forming the slanted end wall. The tab 371 may be substantially semicircular in shape. However, alternative shapes of tabs may be provided, and the tab 371 may be defined in part by a tear line or frangible line instead of a cut line.

In a particularly preferred embodiment, non-linear cut lines 355a, 355b and 369a, 369b extend from the ends of fold lines 359 and 367 respectively to provide flaps which extend into the respective voids to be placed in face contacting relationship with base panel 312.

Turning to the cover portion 310b shown in FIG. 13B, there comprises a plurality of panels adapted to provide an outer cover for the tray. For example, a first side cover panel 322, top cover panel 314, second side cover panel 324, base cover panel 316 and securing flap 326 are hingedly interconnected in series along fold lines 376, 378, 380 and 382 respectively.

A connecting panel arrangement to secure the cover portion 310b to the tray is provided. One suitable arrangement comprises first, second and third connecting panels 336, 334 and 337 hingedly connected in series along fold lines 368 and 366 respectively. First connecting panel 336 is struck from top cover panel 314, and hingedly interconnected thereto along fold line 370. Of course, the cover panel arrangement may be connected to one of the other panels forming the cover portion, or indeed be struck from one or more panels forming the tray, without departing from the scope of the invention. The sides of top cover panel are defined by tear lines 372, 374 which may be mutually divergent along at least a portion of their extent.

In alternative embodiments, it is however envisaged that the frangible lines 372, 374 may be replaced by cut/tear lines and additionally that the cut/tear lines may be co-extensive with a portion of the side edges of the upper cover panel 314. Furthermore, additional connecting panels may be struck from upper cover panel, if it is desired for the tray to be pulled out a greater distance from the cover.

Figure 14:
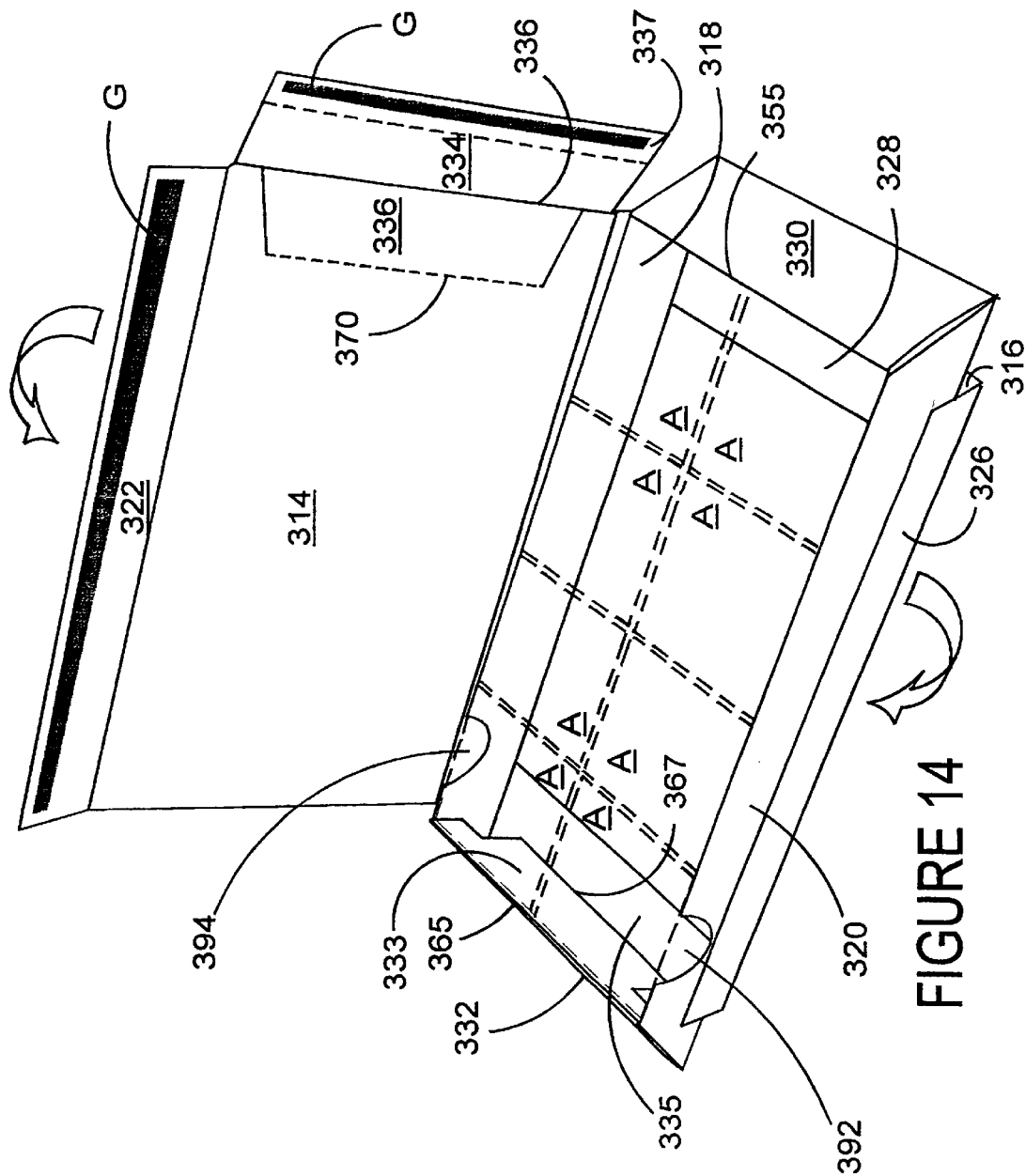
FIG. 14 illustrates the two-part blank of FIGS. 13A and 13B shown during the folding process.

Referring to FIG. 14, the carton is constructed as follows: tray side wall panels 318, 320 are folded out of alignment with tray base panel 312 along their respective fold lines 360, 362 into a substantially perpendicular relationship thereto. Gusset panels 342, 344, 346, 348 are preferably folded along fold lines 356b, 356a, 364b, 364a. End wall panels 330, 332 are folded inwardly about fold lines 356, 364 so as to be brought into face contacting relationship with the adjacent gusset panels, and are preferably secured thereto using glue or other means known in the art. Thereafter, strut panels 329, 333 are folded along fold lines 358 and 365 so as to be brought into a substantially upright position in relation to tray base panel 312, and securing panels 328, 335 are folded along fold lines 359 and 367 so as to be brought into face contacting relationship with tray base panel 312. Panels 328 and 335 are preferably secured to the tray base panel using glue or other suitable means known in the art. The provision of cut lines 369a and 369b permits a strengthened connection to be established between strut panels 329 and 333 and tray base panel 312, as there is effectively a glued portion either side of each strut panel.

Thereafter articles A, for example foodstuff is placed in the tray and the cover is then formed around it. In this embodiment, panels 322, 314, 324, 316 and 326 of the cover portion 310b are folded along fold lines 376, 378, 380, 382 respectively so as to form an open ended tubular structure which encircles tray portion 310a, with base cover panel 316 in substantially face contacting relationship with tray base panel 312. First side cover panel 322 is secured to third side cover panel 326 using glue G, thereby forming a composite side wall panel. In other classes of embodiment, suitable alternative securing means known in the art may be used.

Finally, second and third connecting panels 334 and 337 are folded along fold line 368 so as to overlie first tray end panel 330 to be secured thereto. Glue G secures third connecting panel 337 to first end panel 330. It is desirable for panel 337 to be narrower than the width of the end panel 330, to improve the pivoting action of panels 334, 336 about fold line 366 and 370, in use. The carton is now fully erected and loaded illustrated in FIG. 15A. Again, in other classes of embodiment, alternative securing means known in the art may be employed.

Referring now to FIGS. 15A, 15B, 16A and 16B, in order for the end user to gain access to the contents of the carton, the user preferably depresses tab 371 (FIG. 16) into the void V and engages the aperture thereby formed in second end panel 332. Beneficially, the articles are not interfered with by the user when this occurs.

Tray portion 310a may now be slid out of cover portion 310b as illustrated in FIGS. 15B and 16B, by the user pulling against an edge of the aperture formed by tab 371. During the sliding motion, connecting panel 336 becomes detached from, and moves out of alignment with upper cover panel 314 and connecting panel 334 hinged about fold line 366 so as to no longer overlie end panel 330 and the tray respectively. The connecting panels 334 and 336 are folded inwardly about fold line 370 until a relative position of the tray portion and cover portion is reached, in which the connecting panels 334 and 336 restrict further movement, and articles A may be accessed. In other embodiments, the maximum extent of the relative positions may be altered by altering the size and/or number of connecting panels 334, 336 provided. If the end user wishes to re-close the carton, the above outlined steps may be reversed.

Referring now to FIGS. 17A and 17B, there is shown the fifth embodiment of a two-part blank according to the present invention. Like numerals have, where possible, been used for like parts of the third embodiment shown in FIGS. 12A and 12B, with the addition of the prefix "4".

Turning in particular to FIG. 17A, there is shown a blank 410a, for constructing a tray portion of the carton, which blank comprises a plurality of panels which in this embodiment is provided by a tray base panel 412 hingedly interconnected to tray side panels 418 and 420 along fold lines 460 and 462 respectively. Likewise, first and second tray end panels 430 and 431 are hingedly interconnected to end edges of the base panel 412 along fold lines 464 and 456 respectively.

Preferably, there is provided gusset panels 442 and 444 that are hingedly interconnected to tray side panels 420 and 418 along fold lines 464b and 464a. Further, gusset arrangements 446 and 448, preferably, hingedly interconnect adjacent edges of the tray end panel 431 and side panels 418, 420. Gusset arrangements 446, 448 are similarly configured and, therefore, only arrangement 446 is described in further detail.

Arrangement 446 comprises a first gusset panel 450 hingedly interconnected to tray side panel 420 along fold line 489 which, in this embodiment, is an extension of fold line 456. Similarly, second gusset panel 452 is hingedly interconnected to tray end panel 430 along fold line 491, fold line 491 being, in this embodiment, an extension of fold line 462. First and second gusset panels 450, 452 mutually hingedly interconnect along fold line 488.

As is illustrated in FIG. 17A, fold line 488 intersects with fold lines 489 and 491 at the corner of tray base panel 412. It is, however, envisaged that in alternative embodiments, a portion of one, or both of gusset panels 450, 452 may be cut away, adjacent the corner of tray base panel 412, so as to assist the folding of the gusset arrangement 444 during erection of the carton.

In alternative embodiments, it is anticipated that fold lines 489 and 491 may not extend parallel to fold lines 456 and 462 respectively such that trapezoidal cartons may be formed. Of course, other known gusset arrangements can be used instead without departing from the scope of invention.

A tuck-in flap 435 may be provided, that is hingedly connected to the upper edge of tray end panel 431 along fold line 458. To ease the tucking-in procedure by an end user, at least one corner of flap 435 may be bevelled. Fold line 458 is advantageously interrupted by a cut such that a thumb tab 455 is formed that protrudes slightly into flap 435.

Turning to the outer cover blank 410b, there comprises a first side cover panel 422, top cover panel 414, second side cover panel 424, base cover panel 416 and a securing flap 426 hingedly interconnected in series along fold lines 476, 478, 480, and 482 respectively. Recesses 492, 494, 496 are advantageously provided in first and second side cover panels 422, 424 and securing flap 426 respectively, so as to enable a user to hold the inner tray, described in more detail below. A connecting panel arrangement similar to that described above is provided to connect the cover 410b to the inner tray 410a and to limit the slidable movement between the two parts. The arrangement is similar to the previously described embodiment in that there comprises a series of connecting panels 436, 434, 432, 433 hingedly interconnected along fold lines 468, 466 and 465 respectively. Connecting panel 436 is hingedly connected to top cover panel 414 along fold line 470.

The connecting panels 434 and 436 are preferably struck from upper cover panel 414 and the side edges thereof are advantageously defined by frangible lines 472 and 474 which in this embodiment are parallel and spaced from fold lines 476 and 478. In alternative embodiments, they may be mutually divergent along at least a portion of their extent, and it is further envisaged that the frangible lines 472, 474 may be replaced by cut/tear lines and additionally that the cut/tear lines may be co-extensive with a portion of the side edges of the upper cover panel 414.

Along the opposing end of cover 410a, a first end cover panel 438 is hingedly connected to the opposing end edge of top cover panel along weakened fold line 484. Fold line 484 is preferably interrupted by slot 454 arranged so as to co-operate with thumb-tab 455 when the blank is erected from a carton.

A second end cover panel 440 is preferably hingedly connected to an end edge of base cover panel 416 along weakened fold line 486. Protrusions 441a and 441b are preferably hingedly connected to the side edges of end cover panel 440 along fold lines 443a and 443b, although in other embodiments, the protrusions may be formed integrally with the second end cover panel 440.

Figures 18A, 18B:
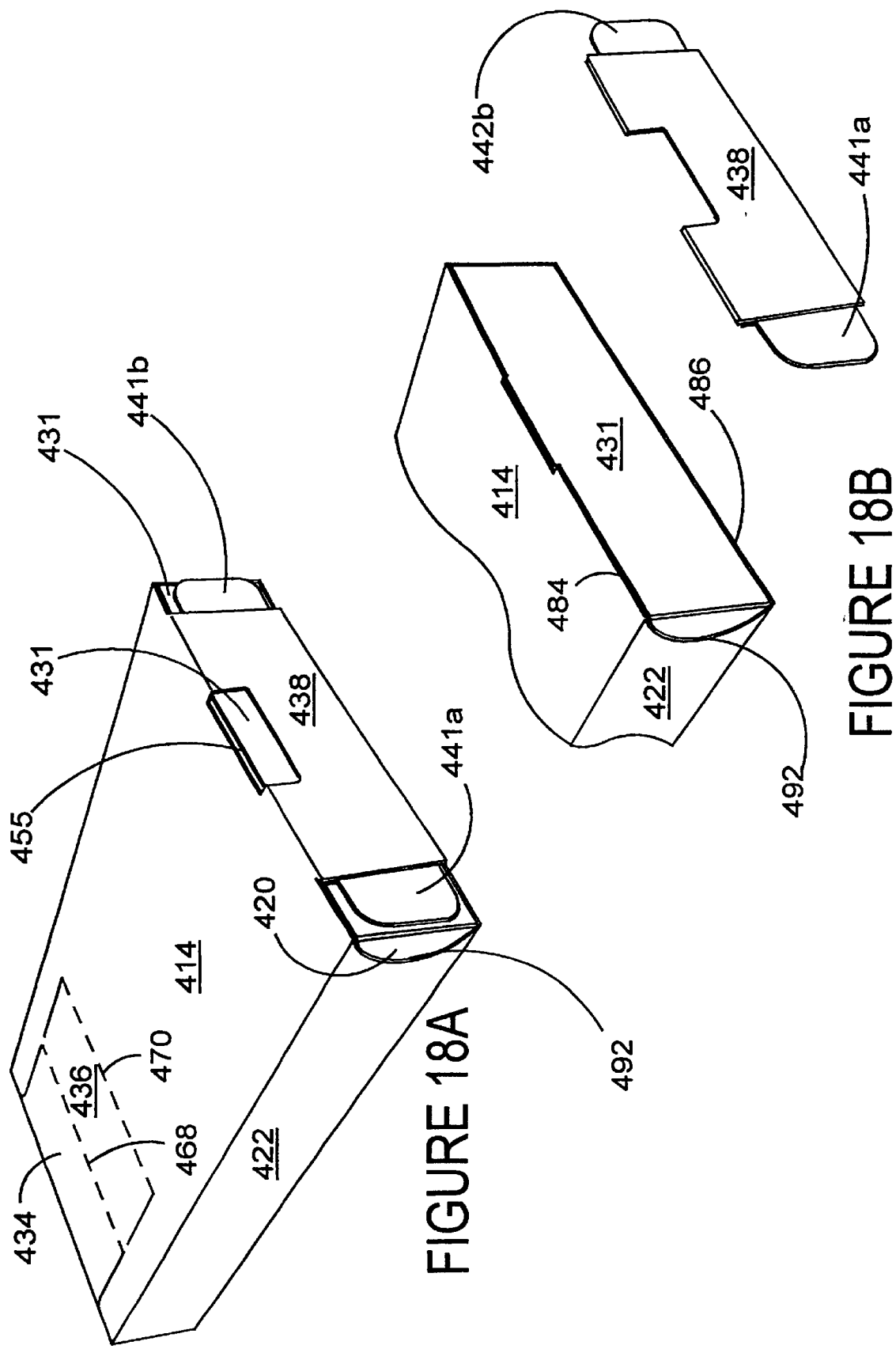
FIG. 18A is a perspective view of a carton formed from the two-part blank illustrated in FIGS. 17A and 17B.
FIG. 18B is a perspective view of the carton of FIG. 18A in which part of an end wall structure has been removed.

In order to construct the carton reference is made to FIG. 17A, 17B and 18A, tray side and end wall panels 418, 420 and 430, 431 of tray portion 400a are folded out of alignment with tray base panel 412 along their respective fold lines 460, 462 and 464, 456 into a substantially perpendicular relationship thereto. Gusset arrangements 446 and 448 are preferably arranged to be disposed inwardly of the side and end panels 418, 420 and 430, 431, and are advantageously secured to either tray end panels 431 or their respective tray side panels 418 and 420 using glue or other means known in the art to maintain the tray portion 410a in a set-up condition. In alternative embodiments, it is however envisaged that the gusset arrangements need not be secured such that second tray end panel 431 may be folded back to be substantially co-planar with tray base panel 412 to gain access to the interior of the carton by the end user. Gusset panels 444 and 442 are folded along fold lines 464a and 464b, and are secured to tray end panel 430 using glue or other suitable means known in the art.

Tuck-in flap 435 is substantially folded out of alignment with end panel 431 so as to be in a substantially spaced parallel relationship with tray base panel 412. The tray is in a set up condition to be loaded with articles A, such as foodstuff.

Turning to FIG. 17B, first side cover panel 422, second side cover panel 425, base cover panel 416 and securing flap 426 of cover portion 410b are then folded out of mutual alignment along fold lines 476, 478, 480 and 482 respectively so as to encircle the tray portion in a similar manner to the cover portion 310b of the previous embodiment. Securing flap 426 is secured to tray side panel 422 using glue, thereby forming a composite side wall panel. In other classes of embodiment, alternative securing means known in the art may be used.

Connecting panels 432 and 433 are folded downwardly about fold line 466, so as to be brought into face contacting relationship with tray end panel 430. Glue or other suitable means known in the art is used to secure connecting panel 433 to end panel 430. Finally, cover end panels 438 and 440 are folded into a substantially perpendicular relationship with upper and base panels 414 and 416 respectively along fold lines 484 and 486 such that end panels 438 and 440 are in overlapping relationship with each other and may be secured together by glue, or other means known in the art, to form a composite end cover wall which is in substantially face contacting relationship with tray end panel 430. Thus, tab 455 protrudes through slot 454 as is illustrated in FIG. 18A.

Referring to FIG. 18B, in order for the end user to gain access to the interior of the carton, composite cover end wall comprising panels 438 and 440, must be first removed by tearing along weakened fold lines 484 and 486. This may advantageously be achieved by the user engaging and pulling protrusions 441a and 441b thereby removing the composite wall.

Figures 19A, 19B:
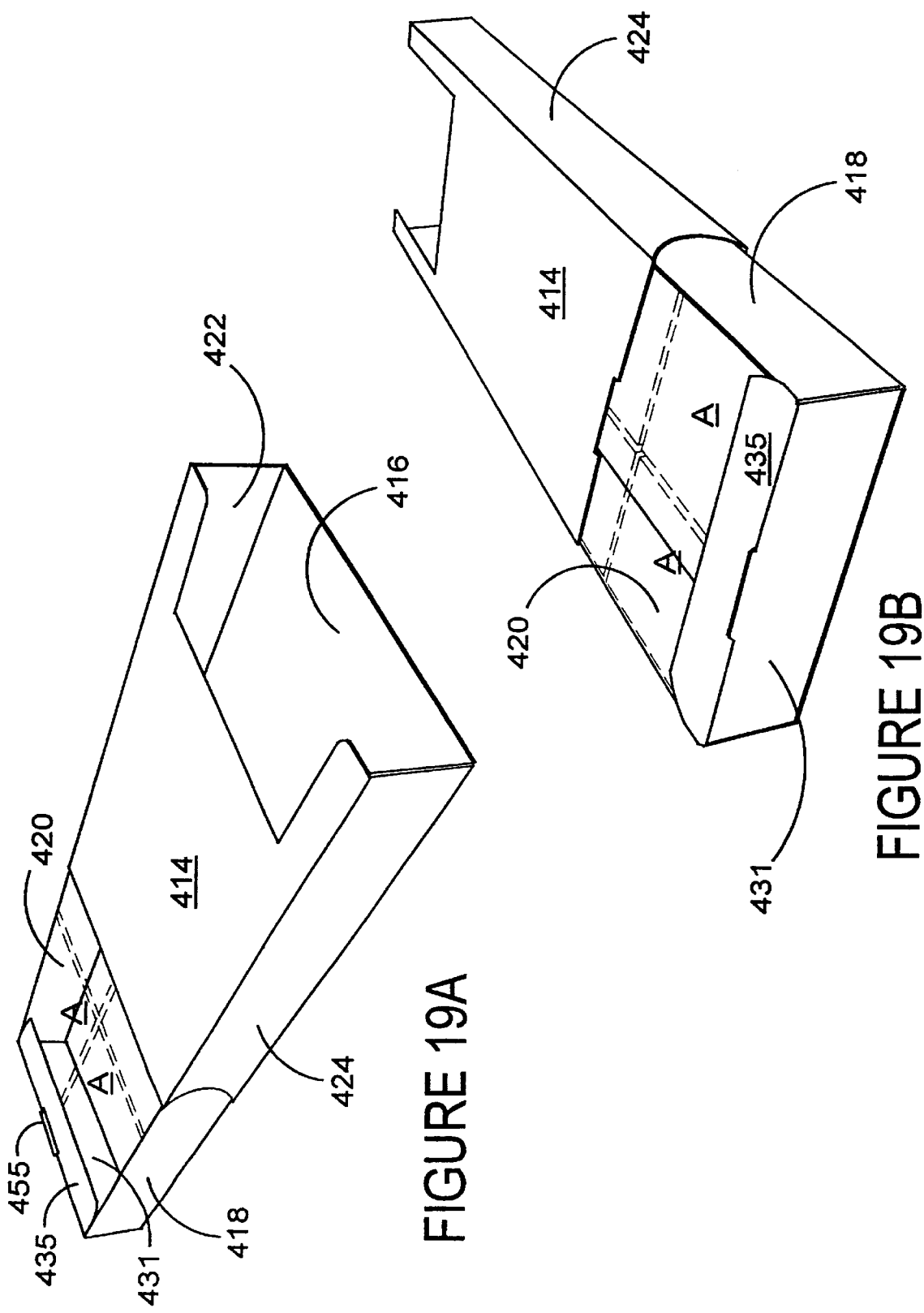
FIGS. 19A and 19B are perspective views of the carton of FIG. 18A viewed from opposing ends thereof in which an inner tray of the carton has been partially pulled out to permit access to the contents of the carton.

The user should then grip the tray at the portions revealed by cutaway portions 492 and 494 and slide the tray out of the sleeve as illustrated in FIGS. 19A and 19B such that articles A may be retrieved. The user can grip the end of the tray revealed by the recesses 492, 496. If second tray end panel 431 is free to hinge about fold line 456, thumb tab 455 may be used to pull panel 431 back into co-linear arrangement with tray base panel 412. If gusset arrangements 446 and 448 prevent the hinging action of second tray end panel 431, then thumb tab 455 may be used to slide the tray out.

During the sliding motion, for those embodiments with a connecting arrangement, the connecting panels 432, 434 and 436 become detached from, and move out of alignment with upper cover panel 414 until a relative position of the tray portion and cover portion is reached, in which the connecting panels 432, 434 and 436 restrict further movement, and articles A may be accessed more easily. The connecting panels 432, 434 and 436 pivot about fold line 465 which is positioned intermediate the ends of end panel 430. More preferably, end panel 433 is connected to a lower part of end panel 430 so that fold line 465 is in a central position. This configuration improves the pivoting action. In other embodiments, the maximum extent of the relative positions may be altered by altering the size and/or number of connecting panels provided.

If the end user wishes to re-close the carton, the above outlined steps may be reversed, and the tray re-closed by tucking in panel 435 beneath upper cover panel 414.

Referring now to FIGS. 20A and 20B, there is shown the sixth embodiment of the present invention. Like numerals have, where possible, been used for like parts of the fourth embodiment shown in FIGS. 13 to 16, with the addition of the prefix "5".

In this embodiment, it can be seen that the panel arrangement of the tray portion 510a incorporating end panels 532, 533 and 535 is substantially identical to the end structure of the fourth embodiment of FIG. 13A which comprises panels 332, 333 and 335. The opposing end panel arrangement incorporating first end panel 530 is substantially identical to the end panel arrangement 430, 442, 444 of the fifth embodiment of FIG. 17A.

Referring now to FIG. 20B in particular, the connecting panels 536, 534, 537 are arranged in a similar manner to the connecting panels 336, 334, 337 of the fourth embodiment of FIG. 13B, but in this embodiment cut lines 572 and 574 are arranged so as to be parallel and spaced from fold lines 576 and 578. At the opposite end of top cover panel 514, there is provided a tear panel 540 hingedly connected to upper cover panel 514 along weakened fold line 586. A glue flap 541 is further hingedly connected to tear panel 540 along weakened fold line 587.

The carton is erected in a similar manner to the cartons of the fourth and fifth embodiments, the flap 541 being secured to panel 532 using glue or other suitable means known in the art, such that tear panel 540 overlies tab 571 and connecting panel 537 similarly being secured to panel 530 using glue or other suitable means. Tear panel 540 provides additional protection to push tab 571 to prevent inadvertent opening prior to end use and to assist in maintaining the integrity of the package.

Figures 21A, 21B:
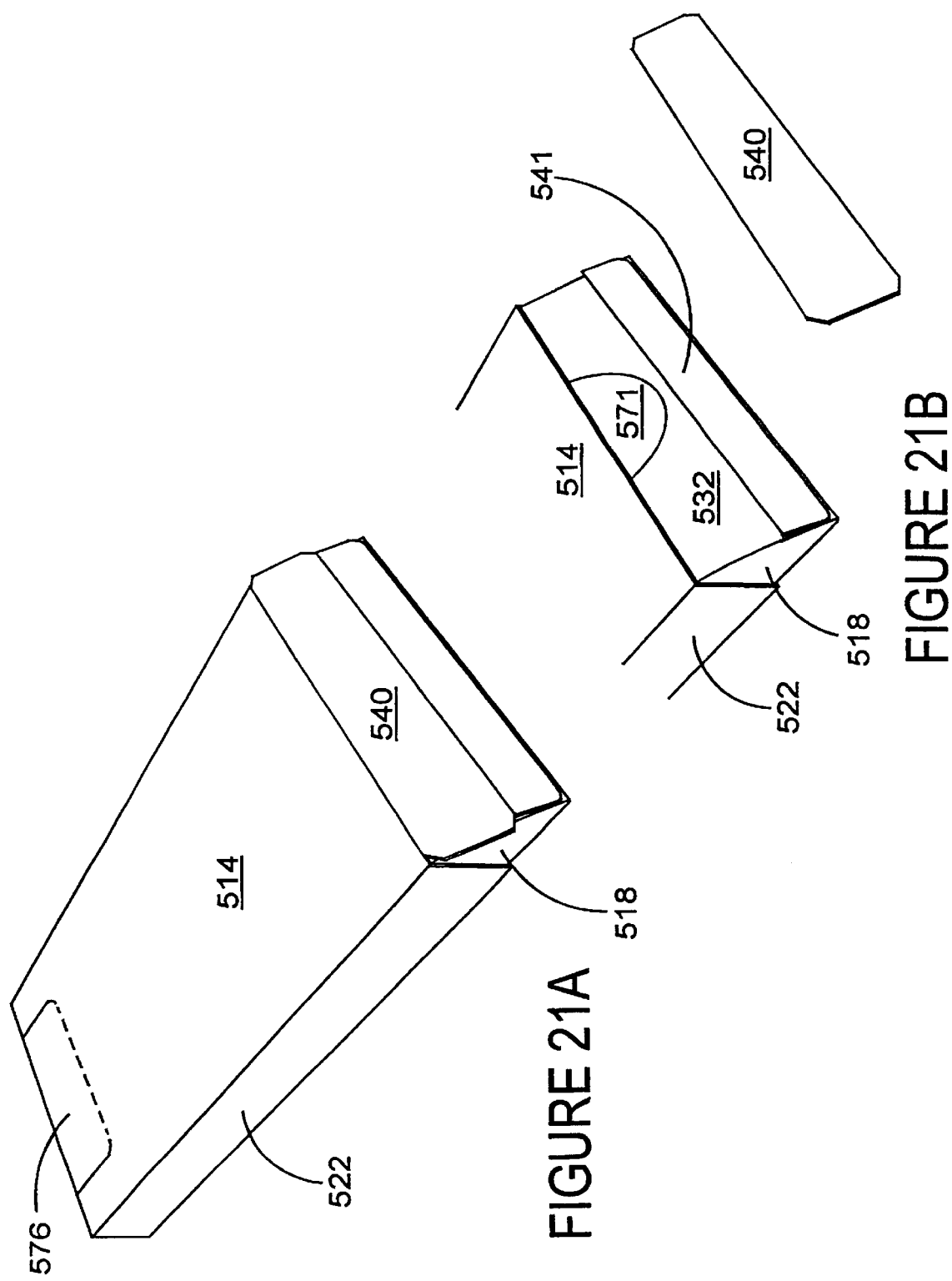
FIG. 21A is a perspective view of a fully erected and loaded carton formed from the blank of FIGS. 20A and 20B.
FIG. 21B is a perspective view of a portion of the carton of FIG. 21A in which part of an end wall structure has been removed.

The fully erected carton is shown in FIG. 21A. In order to gain access to articles A (FIG. 22A) contained within the carton, tear panel 540 is removed, as illustrated in FIG. 21B, thereby revealing tab 571 which may then be pushed inwardly into the void by the user, in order to engage panel 532. The tray portion may then slide out of the cover portion in a similar manner to the previous embodiments as illustrated in FIGS. 22A and 22B.

Figure 23:
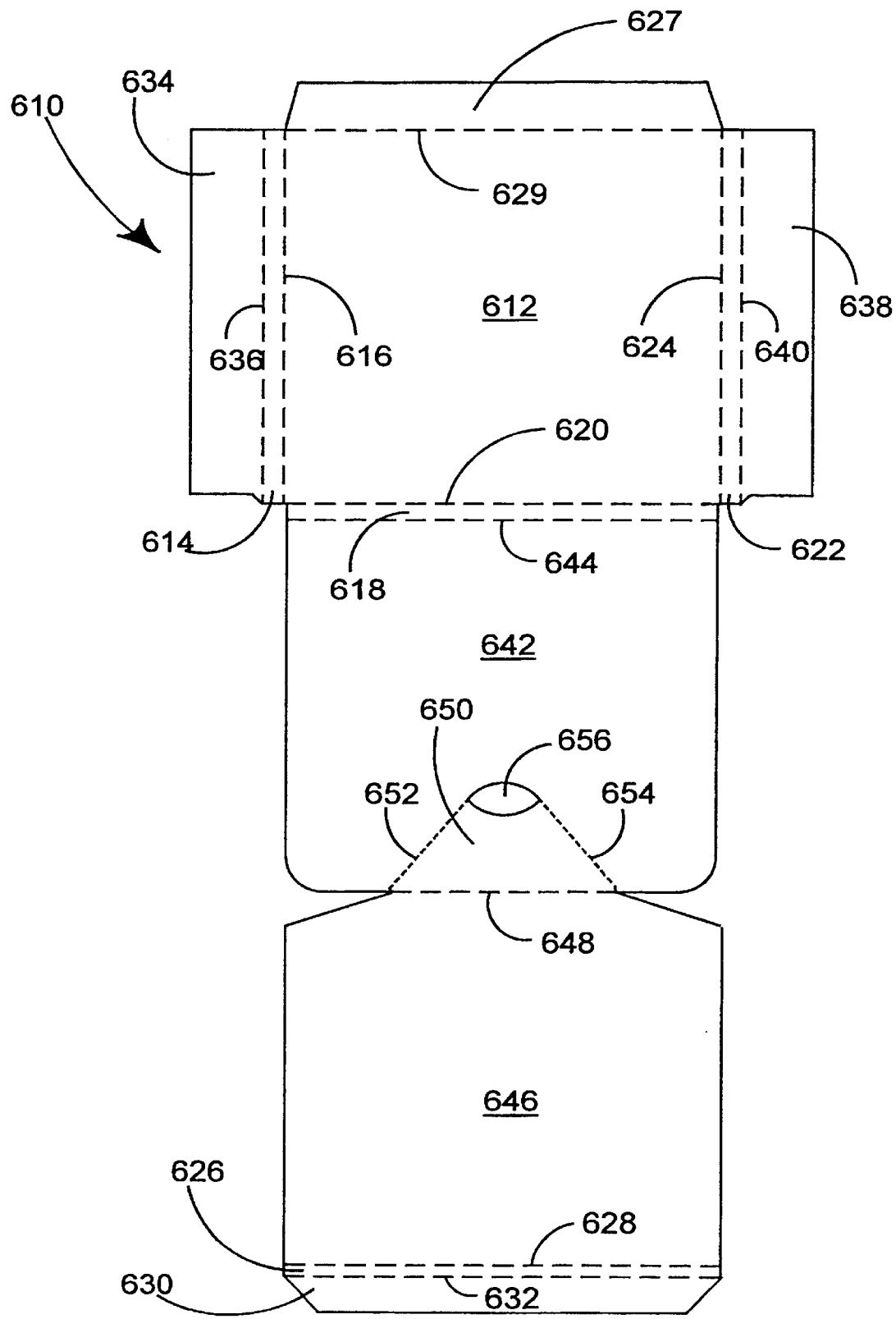
FIG. 23 is plan view of a blank for forming a sleeve according to a further preferred embodiment of the invention.
Figure 34:
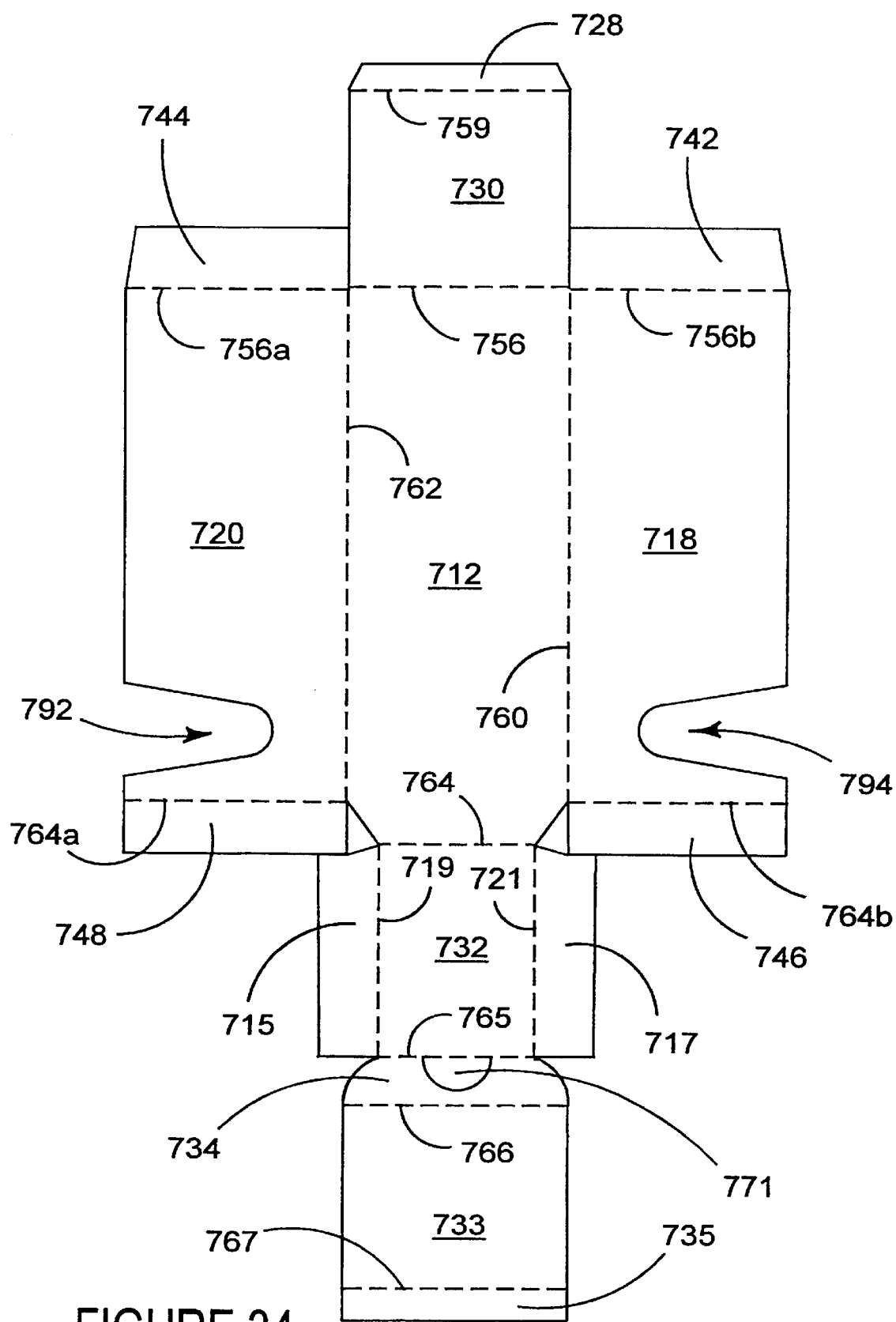
FIG. 34 is a plan views of one of a two-part blank, similar to the one in FIG. 20A, for forming a carton according to a further embodiment of the invention.
Figure 36:
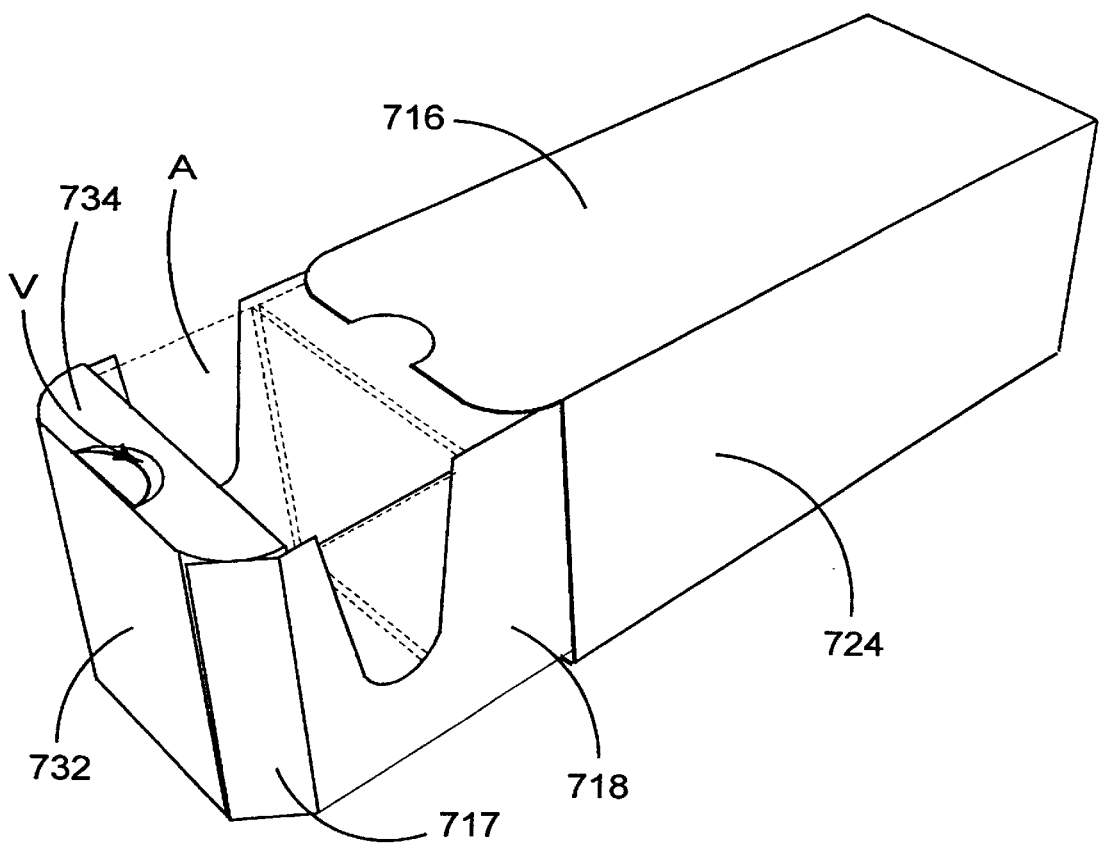
FIG. 36 is a perspective view of the tray of FIG. 35C in which the tray that was once received in a tubular outer cover has been partially pulled out to allow access to the contents of the tray.
Figure 37:
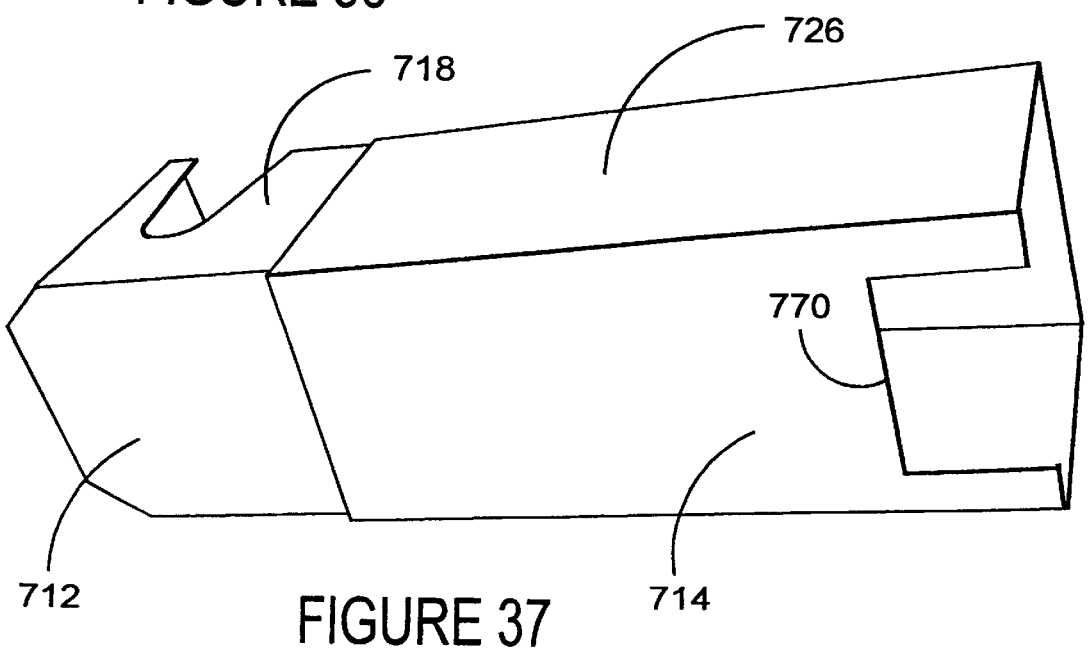
FIG. 37 is a perspective view of the carton of FIG. 36 from its bottom.

The seventh embodiment is illustrated in FIG. 23 in which, there is shown a blank 610 for forming a carton (or sleeve) and tray for receiving one or more articles such as a CD. The blank 610 comprises a plurality of panels for forming an outer sleeve 658 (FIG. 28) including a back panel 612, opposed side panels 614 and 622 hingedly connected to back panel 612 along fold lines 616 and 624 respectively. There further comprises an end panel 618 hingedly connected to one of the end edges of back panel 612 along fold line 620. In this embodiment, the back panel 612 is substantially square to conform to the shape of the disc insert. It is envisaged that other shapes of the base panel and/or sleeve can be adopted according to the shape and/or size of the article to be contained. A cover panel 642 is provided to cover the front face of the sleeve. It is hingedly connected to the outer edge of end panel 618 along lateral fold line 644.

There may further comprise a pair of side support flaps 634 and 638 hingedly connected to the outer edges of side panels 614 and 622 respectively along longitudinal fold lines 636 and 640.

A tray structure 660 (FIG. 32) is provided which is secured to one of the panels forming the outer sleeve 658 by a frangible connection. In this embodiment, the tray structure 660 comprises a support panel 646 hingedly connected to cover panel 642 along fold line 648. The tray structure 660 may further comprise a stopper flap 630 hingedly connected to support panel 646. In this embodiment, stopper flap 630 is hingedly connected to spacer panel 626 along fold line 632 which is interconnected to support panel 646 along fold line 628 that is hingedly connected to cover flap 642 along its end edge defined by fold line 648.

A retention tab 627 is provided which is used to retain the tray within the sleeve. In this embodiment, the retaining tab 627 is hingedly connected to back panel 612 along fold line 629.

In order to assist in removing the tray structure 660 from the sleeve 658 there is optionally provided a pull tab 650 struck from cover panel 642 hingedly connected thereto along fold line 648. More preferably, the frangible connection is formed between the pull tab 650 and the cover panel 642 which comprises two tear lines 652 and 654. A finger aperture 656 may be interposed between the tear lines 652, 654 so that the tear lines extend from the aperture 656 to the fold line 648.

The construction of the carton is illustrated with reference to FIGS. 24, 25a, 25b, 26 and 27: the tray 660 is constructed first, whereby support panel 646 is folded along fold line 648 in direction X into face contacting relationship with cover panel 642, as shown in FIG. 3a. In one class of embodiments, the sleeve contains printed material, for example a booklet B which can be inserted between the support panel 646 and cover panel 642, prior to folding support panel 646. A booklet B is placed on cover panel 642 prior to folding support panel 646, as shown in FIG. 24.

Retaining tab 627 is folded along fold line 629 in direction W to be placed in face contacting relationship with back panel 612 and is secured thereto by glue G or other suitable means known in the art.

The sleeve is at an intermediate stage of construction shown in FIG. 25A ready to receive the article; an example of which is illustrated in FIG. 25b which shows a disc D mounted to an insert I formed from suitable plastics material. The insert and disc are placed on the support panel 646 by hand or automatic machinery. Back panel 612 and retention flap 630 are folded about fold line 620 and 644 in direction Y, as shown in FIG. 26, so as to be placed over the upper surface of the disc. Side support flaps 634 and 638 are then folded inwardly along fold lines 616, 624 and 636, 640 in directions V and Z, as shown in FIG. 27, into spaced overlapping relationship with back panel 612 and are secured to cover panel 642 in face contacting relationship by glue or other suitable means known in the art. In this embodiment, glue is applied at locations G1 shown in FIG. 26.

Thus, the carton is in its completed form with an article, for example a disc or the like held in the sleeve, as shown in FIG. 28. The carton comprises an insert or tray slidably received within a sleeve wherein the insert and the sleeve are joined together along at least one frangible connection 652, 654 so that the sliding movement of the insert is enabled by breaking the frangible connection.

As mentioned above it is envisaged that the carton or sleeve of the present invention can be formed by a series of sequential folding and gluing operations. For example, the sleeve could be part constructed whereby side flaps and cover panel are secured together before loading it with an article. Alternatively, it is envisaged that the carton could be supplied fully constructed in a flat collapsed condition with one of the side or end panels unsecured along one edge to provide an aperture in the side or to end load the sleeve with the or each article.

Turning in detail to the reclosable feature of the embodiment of the present invention, shown in FIG. 28, the fastening means 672 can comprise an access tab 650 on the outer cover panel 642 and, when detached from the cover panel 642, the tab 650 defines between the outer cover panel 642 and the inner cover panel 646 a pocket for receiving a booklet or the like. The access tab 650 is separated from cover panel 642 along frangible fold lines 652 and 654. To assist a user in separating access tab 650 from outer cover panel 642 a finger aperture 656 is provided to pull tab 650 in direction T, shown in FIG. 29. A recess 662 is formed in the pocket to allow the user to remove the booklet B more easily.

In order to remove the disc from the sleeve, pull tab 650 is pulled away from the sleeve as shown in FIGS. 30 and 31 which causes the tray structure 660 to move in an outward direction by relative slidable movement between the tray and the sleeve. At a predetermined point, the stopper flap 632 will abut the retaining tab 627, shown in FIGS. 32 and 33. The tray structure is prevented from moving any further by abutment between the end edges of retaining tab 627 and stopper flap 630 as shown in FIG. 33. This ensures that the tray is not removed completely from the sleeve to allow it to be re-used.

FIGS. 34 to 37 illustrate the eighth embodiment of the invention. The carton of this embodiment is substantially identical to that of the sixth embodiment shown in FIGS. 20A to 22B although being different therefrom in size and shape. Like numerals have, where possible, been used for like parts of the sixth embodiment with the addition of the prefix "7" and therefore the description thereof is being omitted.

It is envisaged that the carton of the present invention can be formed by a series of sequential folding and gluing operations in a straight line machine so that the carton is not required to be rotated or inverted to complete its construction. The folding process is not limited to that described above and may be altered according to particular manufacturing requirements.

It will be recognised that as used herein, the terms "top", "bottom", "side", "end", "inner", "outer", "upper" and "lower" with respect to the panels of the carton (or carton blank) are relative terms, and that the carton (formed from the blank) may be reoriented as necessary or as desired. It will be further recognised that rather than the bottom wall being formed from the interlocked panels, the carton blank may be rearranged whereby some other wall such as a top wall or a side wall is formed from the interlocked panels. Any reference to hinged connection should not be construed as necessarily referring to a single fold line only: indeed it is envisaged that hinged connection can be formed from one or more of one of the following, a score line, a frangible line or a fold line, without departing from the scope of invention.

The invention and its preferred embodiments relate to a carton or a sleeve which is shaped to provide satisfactory rigidity to hold items such as information discs for example floppy discs or foodstuffs with a degree of flexibility. The shape of the blank minimizes the amount of paperboard required for the carton. The carton can be constructed from a flat collapsed condition to position of use and/or loaded by hand or automatic machinery. It is anticipated the invention can be modified without departing from the scope of the invention: for example, side and end panels can be increased in height or width to provide a carton to receive one or more articles of different shapes and/or sizes. Furthermore, the tearing structure, end wall structure, the cover panel and re-closable tray structure shown in the drawings can be applied to other known carton types, for example flully enclosed cartons for beverage containers or for foodstuffs, without departing from the scope of invention.

Beneficially the embodiment of the invention hereinbefore described provides a structure that is sufficiently strong to retain articles and to provide an integral sleeve. In particular, the end walls of the tray provide additional strength to the carton as they act as support members between top and base panels of the outer shell or cover portion. The use of paperboard material provides an "environmentally" friendly alternative and the sleeves made from paperboard can include printed matter for marketing purposes.

What is claimed is:

1. A carton for packaging one or more articles comprising an inner tray and an outer sleeve disposed around said inner tray wherein at least one of the inner tray and the outer sleeve is provided with a plurality of void-forming panels for forming a void for protecting an article in the inner tray from being damaged and a push tab defined in one or more of said void-forming panels to facilitate opening of the carton, wherein said void-forming panels include an end wall of said one of the inner tray and the outer sleeve and a base of said one of the inner tray and the outer sleeve, wherein said end wall is slanted such that said end wall defines an acute angle with respect to said base, and wherein said push tab is defined in said end wall.

2. A carton as claimed in claim 1 wherein said push tab is hingedly connected to said one of said inner tray and said outer sleeve such that said push tab is folded into the void when depressed.

3. A carton as claimed in claim 1 wherein said void-forming panels further include an internal partition adapted to prevent an article within the carton from moving into the void.

4. A carton as claimed in claim 3 wherein said internal partition is provided by a support member extending between said end wall and said base wall to protect an article within the carton from being damaged.

5. A carton as claimed in claim 4 wherein said support member is hingedly connected to said inner tray and the push tab is hingedly connected to said outer sleeve to be engaged with said support member to reclose the carton after the push tab is torn open.

6. A carton as claimed in claim 1 further comprising a connecting panel arrangement for interconnecting said inner tray and said outer sleeve such that said inner tray is slidable with respect to said outer sleeve along a sleeve axis of said outer sleeve and that relative movement of said inner tray and said outer sleeve is limited.

7. A carton as claimed in claim 1 wherein said outer sleeve includes a top, a base, opposed side walls and opposed end walls, wherein said void is defined by said base of said outer sleeve and one of said end walls of said outer sleeve.

8. A carton as claimed in claim 7 wherein said end wall of said one of the inner and tray and the outer sleeve comprises said one end wall of said outer sleeve, said base of said one of the inner tray and the outer sleeve comprises said base of the outer sleeve, a base of the inner tray being disposed to support an article thereon, said inner tray further includes a an end wall extending upwardly from said base of the inner tray to a free end of the end wall of the inner tray for engagement with a junction between said one end wall of said outer sleeve and said top of said outer sleeve.

9. A carton as claimed in claim 1 wherein said end wall of said one of the inner tray and the outer sleeve is an end wall of the inner tray, said outer sleeve is slidably receiving said inner tray, and said outer sleeve comprises an end closure structure for restricting relative sliding movement between said inner tray and said outer sleeve, said end closure structure comprising an end flap secured to said end wall of said inner tray, said end flap comprising a removable portion removable from said end closure structure to expose said push tab of said inner tray as well as to break said end closure structure to thereby permitting said sliding movement.

10. A carton for packaging one or more articles comprising an inner tray and an outer sleeve disposed around said inner tray wherein at least one of the inner tray and the outer sleeve is provided with a plurality of void-forming panels for forming a void and a push tab defined in one or more of said void-forming panels to facilitate opening of the carton, said carton further comprising a connecting panel arrangement for interconnecting said inner tray and said outer sleeve such that said inner tray is slidable with respect to said outer sleeve alone a sleeve axis of said outer sleeve, wherein said connecting panel arrangement is struck from and hingedly connected to said outer sleeve.

11. A carton as claimed in claim 10 wherein said connecting panel arrangement comprises a first panel secured to a section of an end wall of said inner tray, and a second panel hingedly interconnecting said first panel and said outer sleeve, said first and second panels being arranged so as to limit relative movement of said inner tray and said outer sleeve.

12. A carton as claimed in claim 11 wherein said second panel substantially overlies said inner tray when said inner tray is in a closed position where said inner tray is fully received within said outer sleeve.

13. A carton comprising an inner tray, an outer sleeve disposed around said inner tray, and a connecting panel arrangement for connecting said inner tray to said outer sleeve for sliding movement of said inner tray with respect to said outer sleeve, said connecting panel arrangement comprising a first panel secured to a section of an end wall of said inner tray, and a second panel hingedly interconnecting said the first panel and the outer sleeve, said first and second panels being arranged so as to restrict relative movement of said inner tray beyond a certain position relative to said outer sleeve, wherein said second panel is disposed flat on another section of said end wall of said inner tray when said inner tray is in a closed position where said inner tray is fully received in said outer sleeve.

14. A carton comprising an inner tray, an outer sleeve disposed around said inner tray, and a connecting panel arrangement for connecting said inner tray to said outer sleeve for sliding movement of said inner tray with respect to said outer sleeve, said connecting panel arrangement comprising a first panel secured to a section of an end wall of said inner tray, and a second panel hingedly interconnecting said the first panel and the outer sleeve, said first and second panels being arranged so as to restrict relative movement of said inner tray beyond a certain position relative to said outer sleeve, wherein said first panel is hinged to said second panel at a location intermediate upper and lower edges of said end wall to aid hinged movement of said first and second panels during said sliding movement of said inner tray.

* * * * *